United States Patent
Ko et al.

(10) Patent No.: US 11,470,566 B2
(45) Date of Patent: Oct. 11, 2022

(54) METHOD AND DEVICE FOR TRANSMITTING AND RECEIVING S-SSB IN NR V2X

(71) Applicant: LG ELECTRONICS INC., Seoul (KR)

(72) Inventors: Woosuk Ko, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/453,248

(22) Filed: Nov. 2, 2021

(65) Prior Publication Data

US 2022/0061005 A1 Feb. 24, 2022

Related U.S. Application Data

(63) Continuation of application No. PCT/KR2020/005848, filed on May 4, 2020.
(Continued)

(30) Foreign Application Priority Data

| May 3, 2019 | (KR) | 10-2019-0052171 |
| May 22, 2019 | (KR) | 10-2019-0060120 |
| Oct. 4, 2019 | (KR) | 10-2019-0123029 |

(51) Int. Cl.
*H04W 56/00* (2009.01)
*H04L 27/26* (2006.01)
(Continued)

(52) U.S. Cl.
CPC ..... *H04W 56/001* (2013.01); *H04L 27/26025* (2021.01); *H04W 72/0406* (2013.01); *H04W 72/0446* (2013.01); *H04N 21/8547* (2013.01)

(58) Field of Classification Search
CPC . H04W 76/025; H04W 76/15; H04W 56/001; H04Q 2213/13196; H04N 21/8547
See application file for complete search history.

(56) References Cited

U.S. PATENT DOCUMENTS

2016/0295624 A1* 10/2016 Novlan .................. H04L 67/12
2019/0037509 A1* 1/2019 Li ........................ H04W 56/001
(Continued)

FOREIGN PATENT DOCUMENTS

KR    20190011699    2/2019

OTHER PUBLICATIONS

R1-1905124, "Discussion on sidelink synchronization mechanism for NR V2X", Apr. 8-12, 2019 (Year: 2019).*
(Continued)

*Primary Examiner* — Salvador E Rivas
(74) *Attorney, Agent, or Firm* — Lee, Hong, Degerman, Kang & Waimey PC

(57) ABSTRACT

Provided are a method for performing wireless communication by a first device and a device for supporting same. The method may comprise the steps of: receiving, from a base station, information associated with time offset from a start of a sidelink synchronization signal block (S-SSB) period to a first S-SSB; receiving, from the base station, information associated with a time interval between S-SSBs; and on the basis of at least one of the time offset or the time interval, transmitting one or more S-SSBs to a second device within the S-SSB period.

20 Claims, 28 Drawing Sheets

Related U.S. Application Data

(60) Provisional application No. 62/849,146, filed on May 16, 2019.

(51) Int. Cl.
*H04W 72/04* (2009.01)
*H04N 21/8547* (2011.01)

(56) References Cited

U.S. PATENT DOCUMENTS

2020/0389929 A1* 12/2020 Harada ................. H04W 76/15
2021/0212050 A1* 7/2021 Lu ......................... H04L 5/0053

OTHER PUBLICATIONS

PCT International Application No. PCT/KR2020/005848, International Search Report dated Jul. 31, 2020, 4 pages.
ITL, "Discussion on sidelink synchronization mechanism for NR V2X," R1-1905124, 3GPP TSG RAN WG1 #96-bis Meeting, Apr. 2019, 8 pages.
Huawei et al., "Sidelink synchronization mechanisms for NR V2X," R1-1903946, 3GPP TSG RAN WG1 Meeting #96bis, Apr. 2019, 11 pages.
Etri, "Discussion on NR V2X sidelink synchronization," R1-1904667, 3GPP TSG RAN WG1 #96bis, Apr. 2019, 8 pages.
Spreadtrum Communications, "Discussion on synchronization mechanism for NR V2X," R1-1904792, 3GPP TSG RAN WG1 Meeting 96#bis, Apr. 2019, 8 pages.

* cited by examiner

FIG. 4
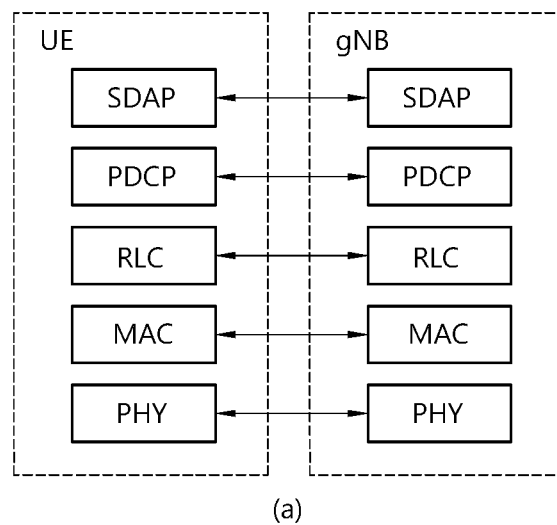
(a)
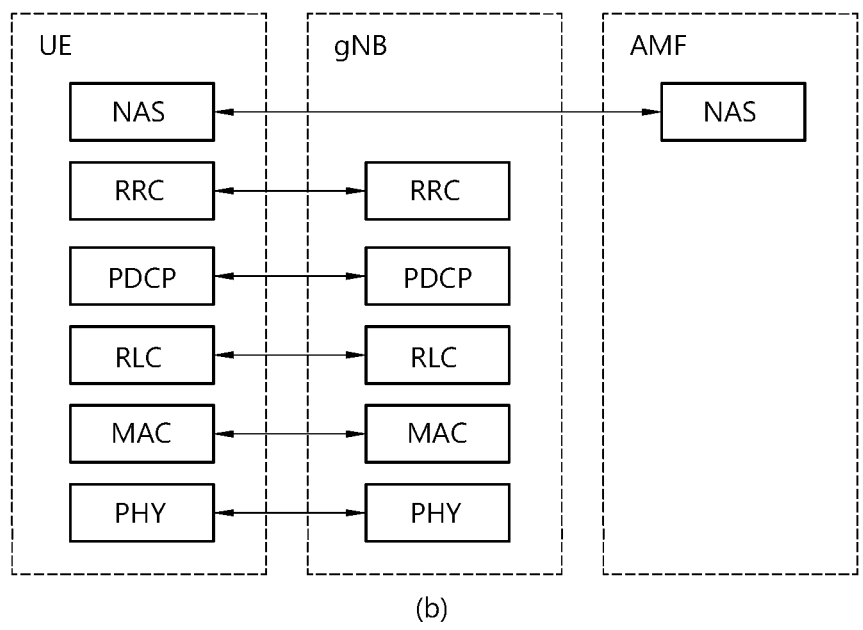
(b)

FIG. 8
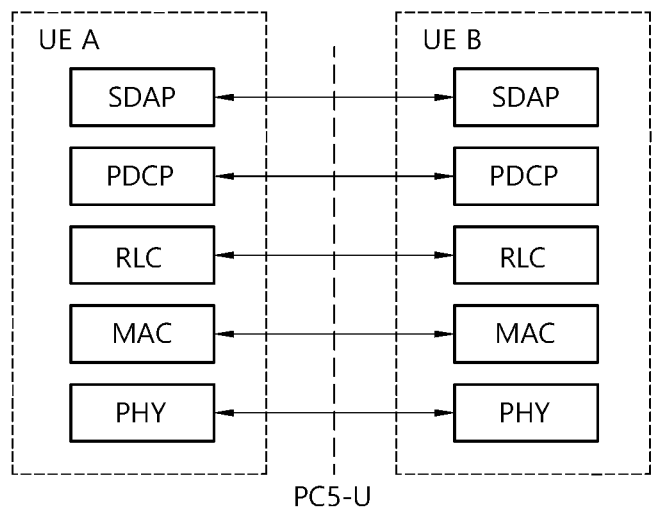
(a)
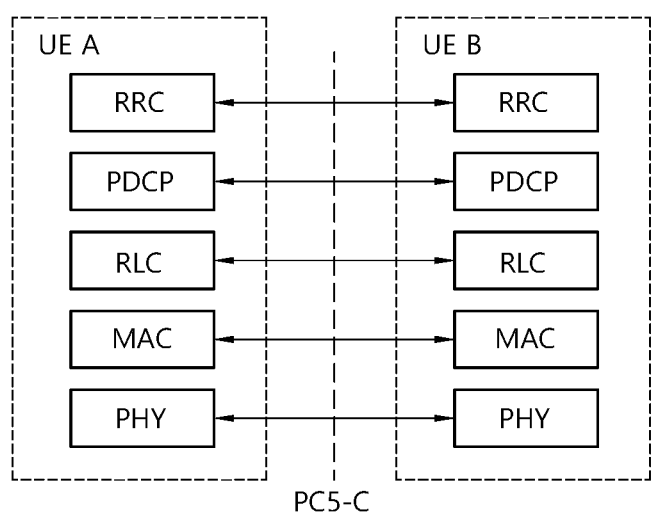
(b)

METHOD AND DEVICE FOR TRANSMITTING AND RECEIVING S-SSB IN NR V2X

CROSS-REFERENCE TO RELATED APPLICATIONS

This application is a continuation of International Application No. PCT/KR2020/005848, filed on May 4, 2020, which claims the benefit of earlier filing date and right of priority to Korean Application Nos. 10-2019-0052171 filed on May 3, 2019, 10-2019-0060120 filed on May 22, 2019, and 10-2019-0123029 filed on Oct. 4, 2019, and also claims the benefit of U.S. Provisional Application No. 62/849,146 filed on May 16, 2019, the contents of which are all hereby incorporated by reference herein in their entireties.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, a UE needs to transmit one or more S-SSBs. In this case, a method for efficiently transmitting S-SSBs by the UE and an apparatus supporting the same need to be proposed.

Technical Solutions

In one embodiment, a method for performing wireless communication by a first device is provided. The method may comprise: receiving, from a base station, information related to a time offset from a start of a sidelink synchronization signal block (S-SSB) period to a first S-SSB; receiving, from the base station, information related to a time interval between S-SSBs; and transmitting, to a second device, one or more S-SSBs within the S-SSB period based on at least one of the time offset or the time interval.

In one embodiment, a first device configured to perform wireless communication is provided. The first device may comprise: one or more memories storing instructions; one or more transceivers; and one or more processors connected to the one or more memories and the one or more transceivers. For example, the one or more processors may execute the instructions to: receive, from a base station, information related to a time offset from a start of a sidelink synchronization signal block (S-SSB) period to a first S-SSB; receive, from the base station, information related to a time interval between S-SSBs; and transmit, to a second device, one or more S-SSBs within the S-SSB period based on at least one of the time offset or the time interval.

Effects Of The Disclosure

The user equipment (UE) may efficiently perform SL communication.

BRIEF DESCRIPTION OF THE DRAWINGS

FIG. 4 shows a radio protocol architecture, based on an embodiment of the present disclosure.

FIG. 8 shows a radio protocol architecture for a SL communication, based on an embodiment of the present disclosure.

DESCRIPTION OF EXEMPLARY EMBODIMENTS

Figure 1:
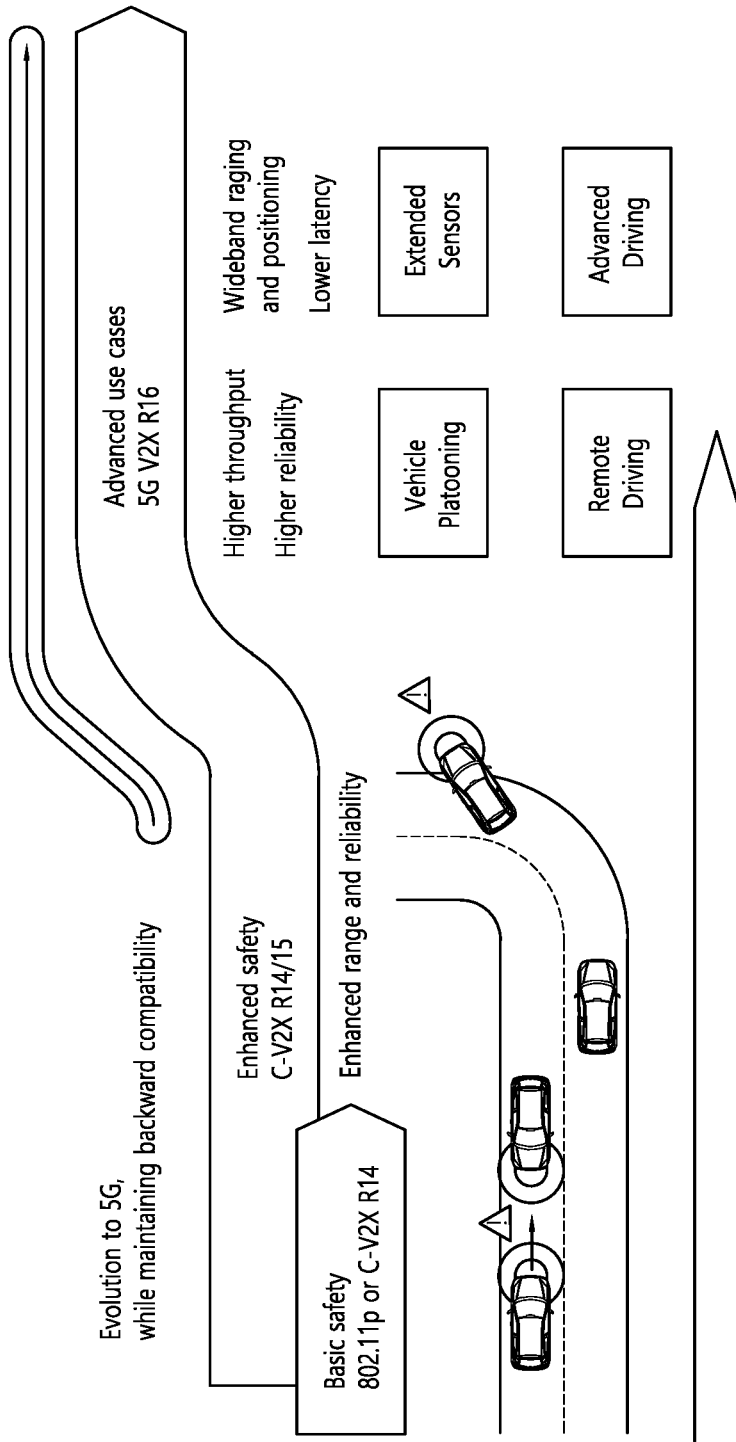
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
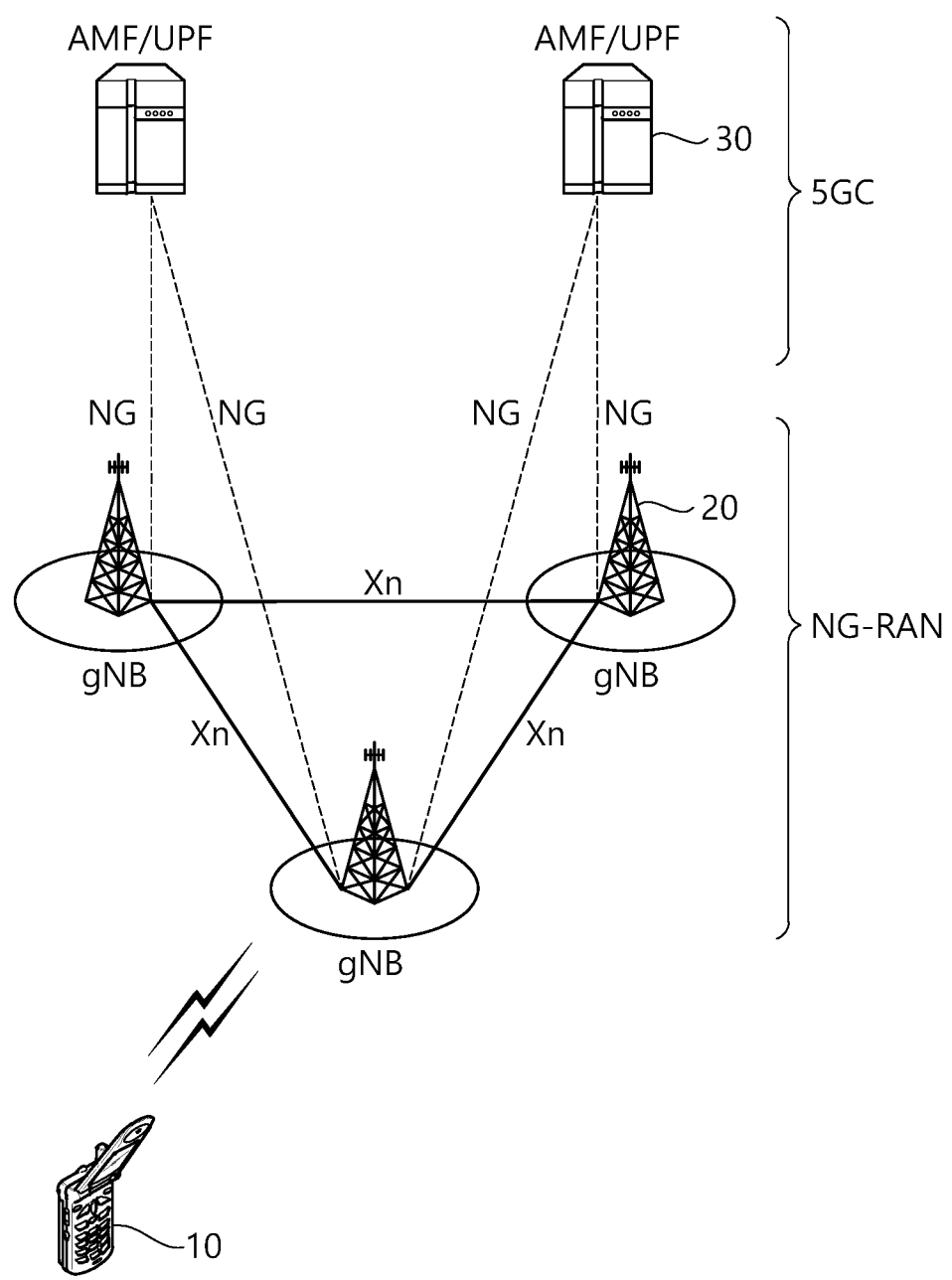
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
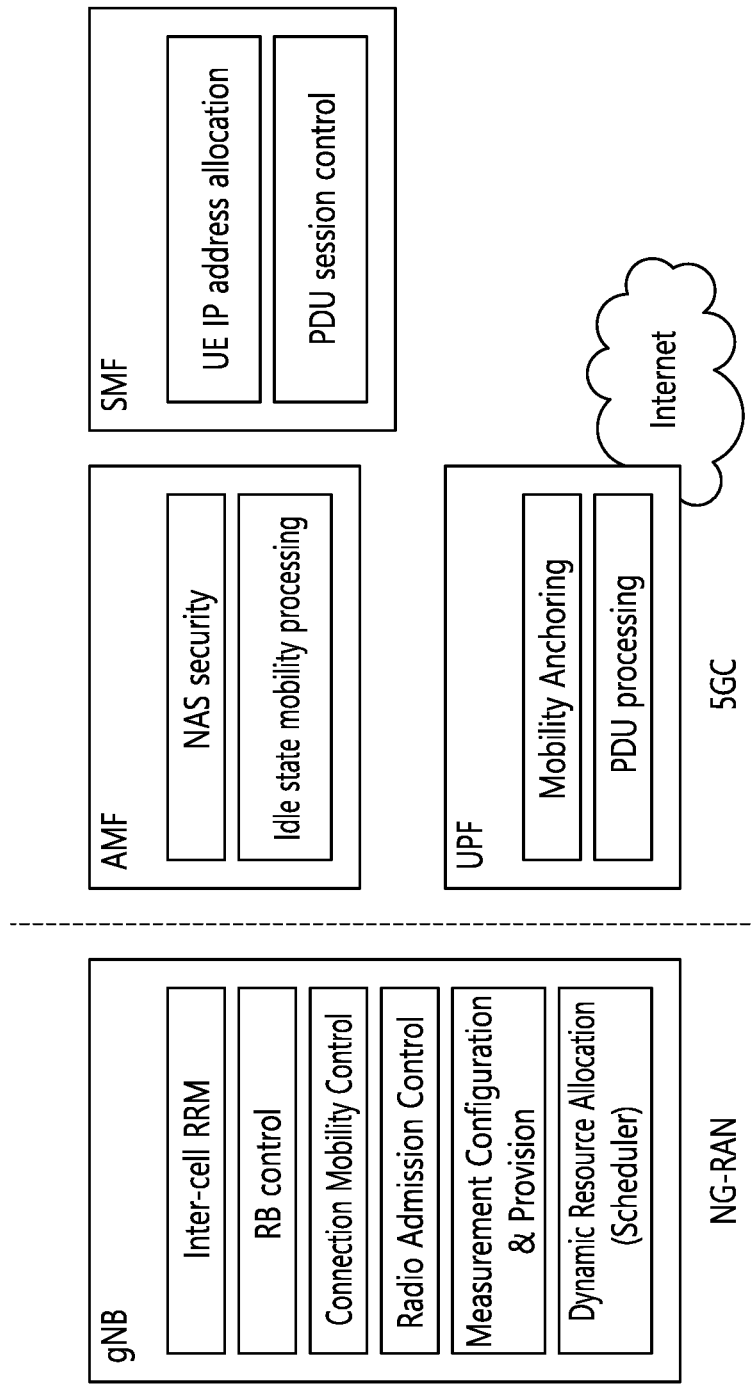
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, based on an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
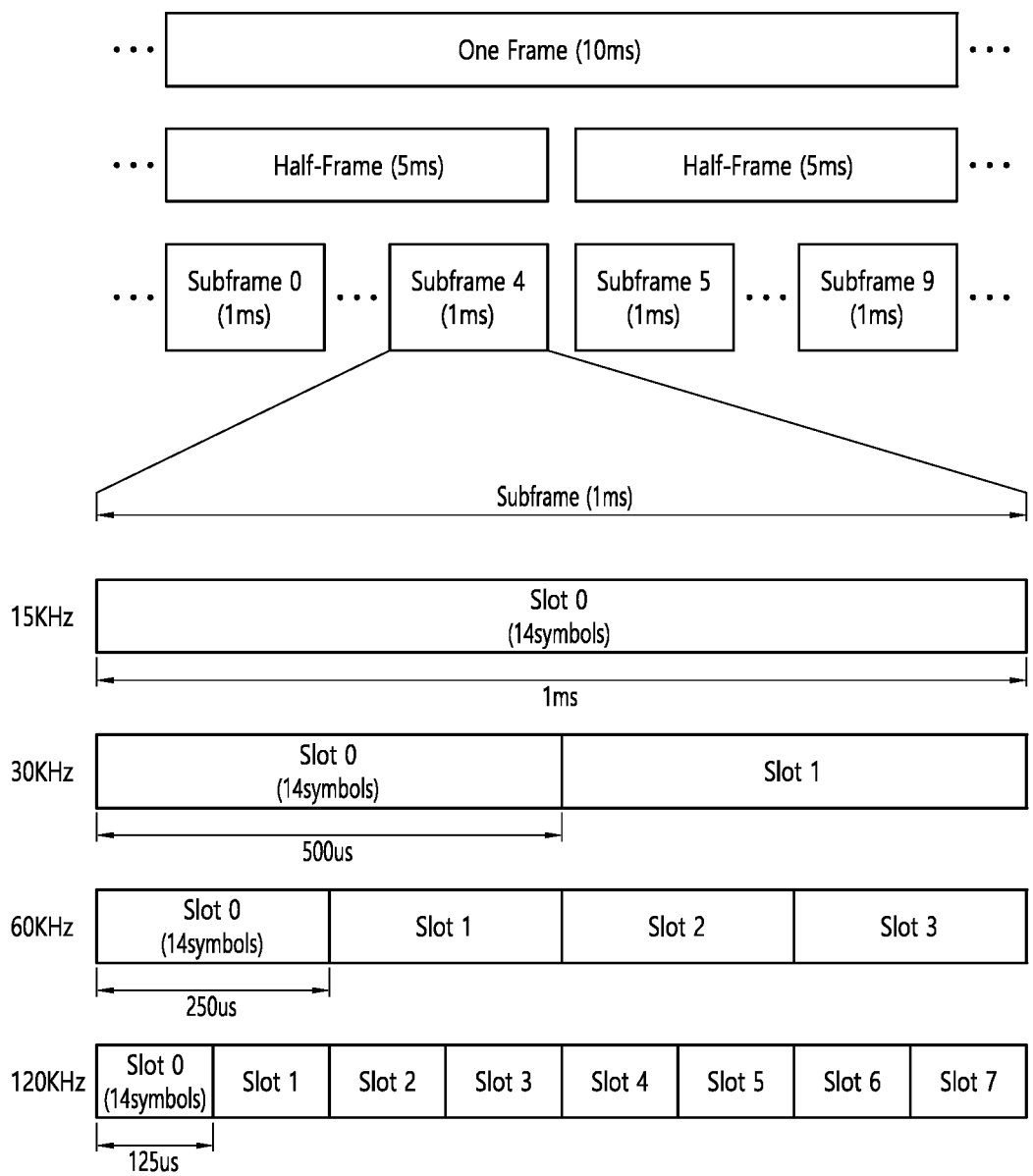
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the INK system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
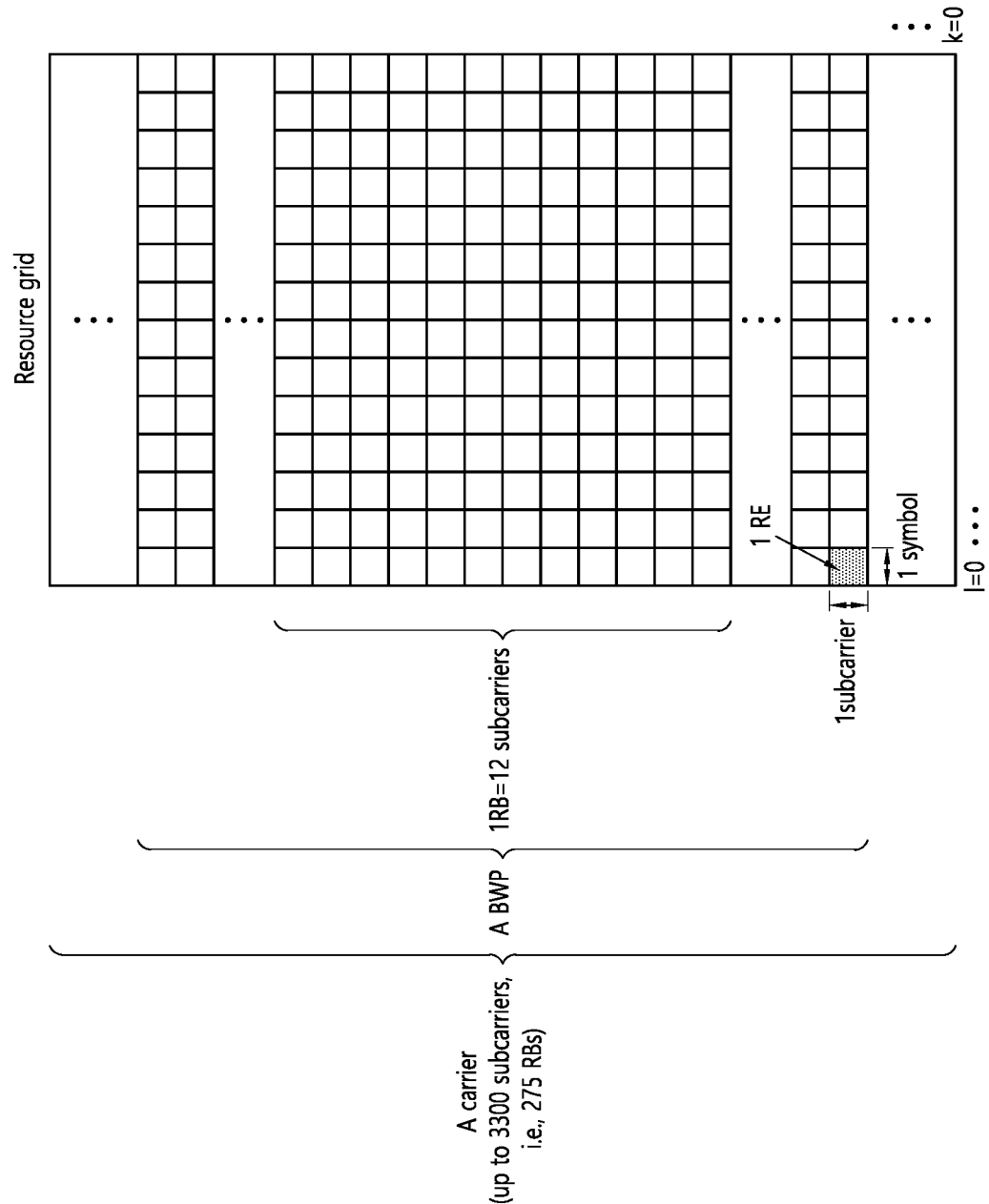
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the B S/network configures the BWP to the UE and the B S/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP.

In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
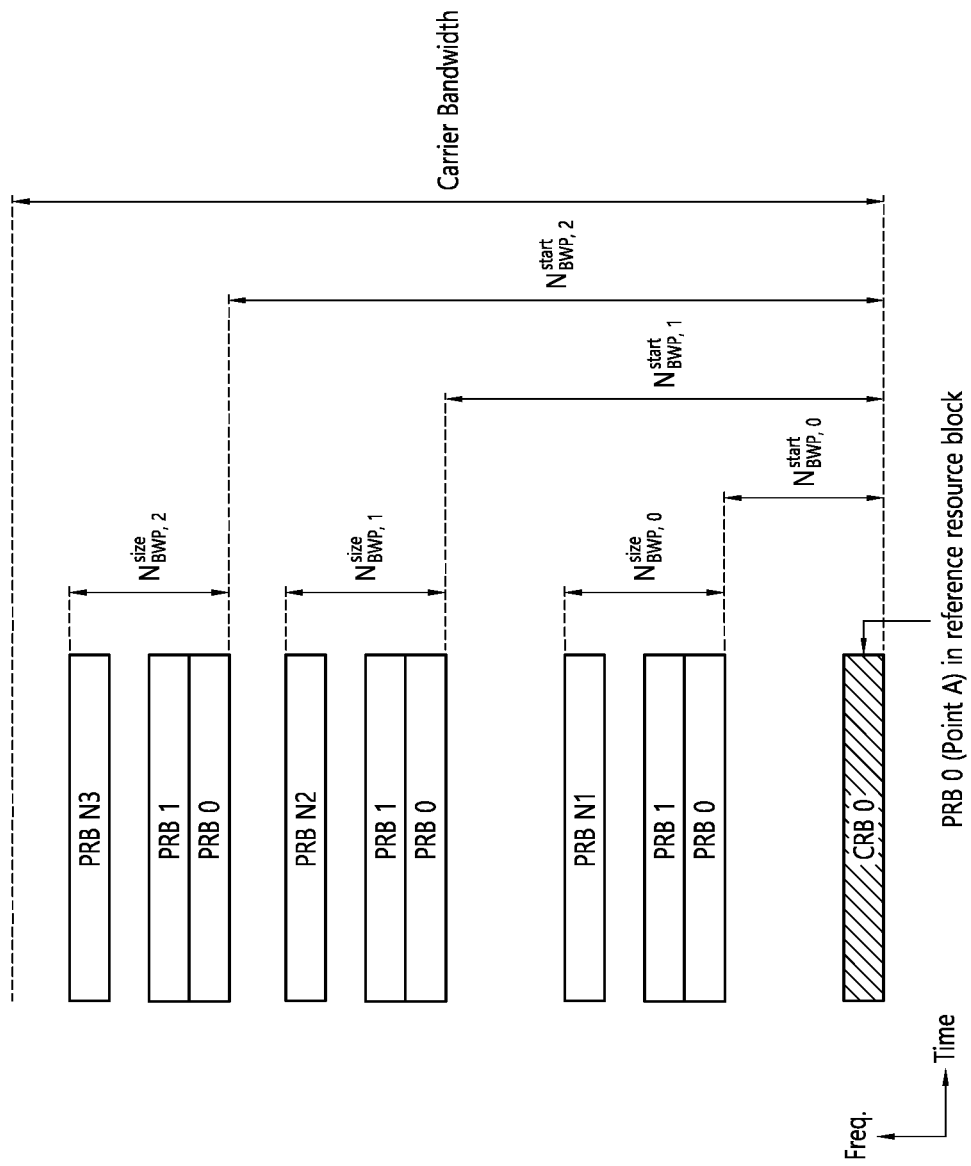
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, based on an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
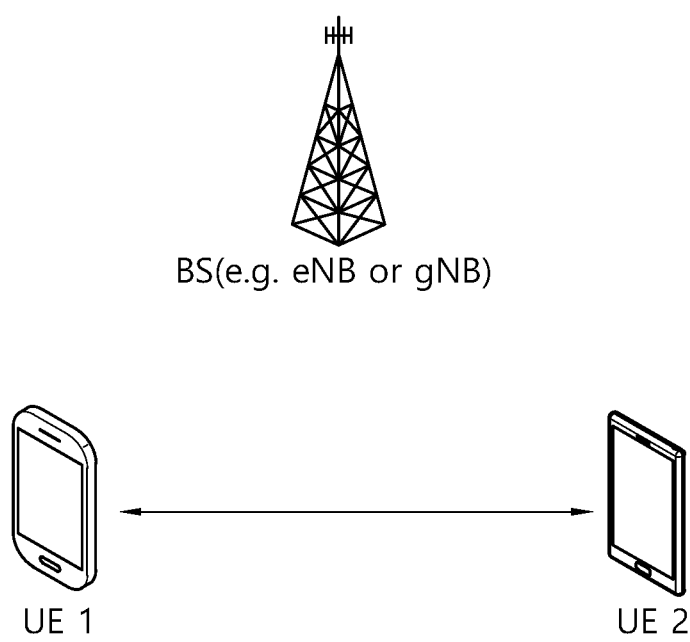
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
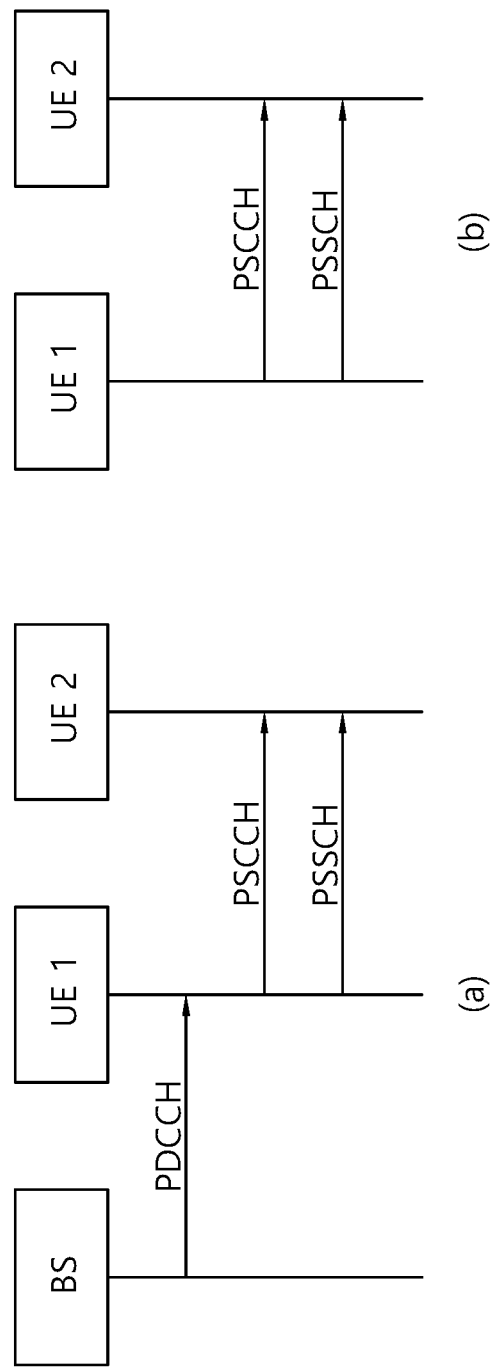
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
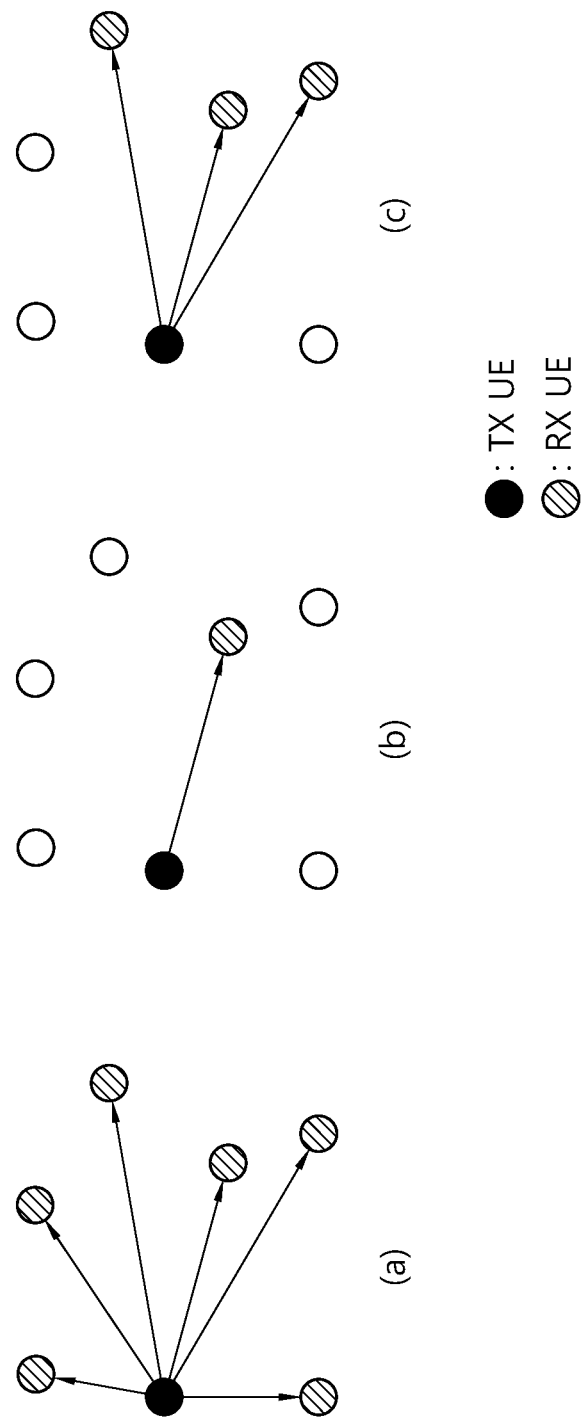
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, synchronization acquisition of an SL UE will be described.

In time division multiple access (TDMA) and frequency division multiple access (FDMA) systems, accurate time and frequency synchronization is essential. If the time and frequency synchronization is not accurate, system performance may be degraded due to inter symbol interference (ISI) and inter carrier interference (ICI). The same is true for V2X. In V2X, for time/frequency synchronization, sidelink synchronization signal (SLSS) may be used in a physical layer, and master information block-sidelink-V2X (MIB-SL-V2X) may be used in a radio link control (RLC) layer.

Figure 12:
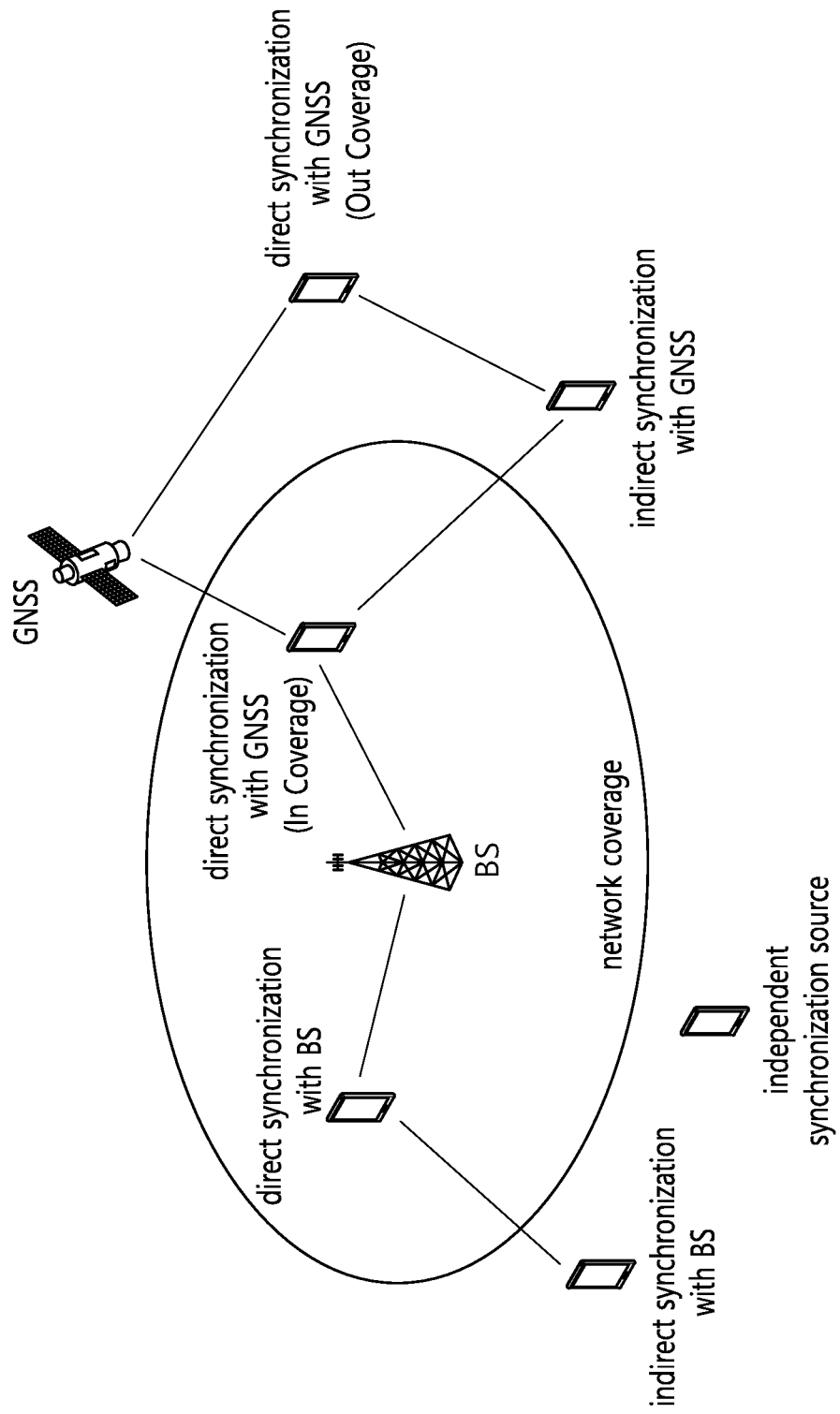
FIG. 12 shows a synchronization source or synchronization reference of V2X, based on an embodiment of the present disclosure.

FIG. 12 shows a synchronization source or synchronization reference of V2X, based on an embodiment of the present disclosure. The embodiment of FIG. 12 may be combined with various embodiments of the present disclosure.

Referring to FIG. 12, in V2X, a UE may be directly synchronized with a global navigation satellite system (GNSS), or may be indirectly synchronized with the GNSS through a UE (inside network coverage or outside network coverage) directly synchronized with the GNSS. If the GNSS is configured as the synchronization source, the UE may calculate a DFN and a subframe number by using a coordinated universal time (UTC) and a (pre-)configured direct frame number (DFN) offset.

Alternatively, the UE may be directly synchronized with a BS, or may be synchronized with another UE which is time/frequency-synchronized with the BS. For example, the BS may be an eNB or a gNB. For example, if the UE is inside the network coverage, the UE may receive synchronization information provided by the BS, and may be directly synchronized with the BS. Thereafter, the UE may provide the synchronization information to adjacent another UE. If BS timing is configured based on synchronization, for synchronization and downlink measurement, the UE may be dependent on a cell related to a corresponding frequency (when it is inside the cell coverage at the frequency), or a primary cell or a serving cell (when it is outside the cell coverage at the frequency).

The BS (e.g., serving cell) may provide a synchronization configuration for a carrier used in V2X or SL communication. In this case, the UE may conform to the synchronization configuration received from the BS. If the UE fails to detect any cell in a carrier used in the V2X or SL communication and fails to receive the synchronization configuration from the serving cell, the UE may conform to a pre-configured synchronization configuration.

Alternatively, the UE may be synchronized with another UE which fails to obtain synchronization information directly or indirectly from the BS or the GNSS. A synchronization source or preference may be pre-configured to the UE. Alternatively, the synchronization source and preference may be configured through a control message provided by the BS.

An SL synchronization source may be associated/related with a synchronization priority. For example, a relation between the synchronization source and the synchronization priority may be defined as shown in Table 5 or Table 6. Table 5 or Table 6 are for exemplary purposes only, and the relation between the synchronization source and the synchronization priority may be defined in various forms.

TABLE 5

| Priority level | GNSS-based synchronization | eNB/gNB-based synchronization |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | All other UEs | GNSS |
| P4 | N/A | All UEs directly synchronized with GNSS |
| P5 | N/A | All UEs indirectly synchronized with GNSS |
| P6 | N/A | All other UEs |

TABLE 6

| Priority level | GNSS-based synchronization | eNB/gNB-based synchronization |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | BS | GNSS |
| P4 | All UEs directly synchronized with BS | All UEs directly synchronized with GNSS |
| P5 | All UEs indirectly ynchronized with BS | All UEs indirectly synchronized with GNSS |
| P6 | Remaining UE(s) having low priority | Remaining UE(s) having low priority |

In Table 5 or Table 6, P0 may denote a highest priority, and P6 may denote a lowest priority. In Table 5 or Table 6, the BS may include at least one of a gNB and an eNB.

Whether to use GNSS-based synchronization or BS-based synchronization may be (pre-)configured. In a single-carrier operation, the UE may derive transmission timing of the UE from an available synchronization reference having the highest priority.

Meanwhile, as described above, the sidelink synchronization signal block (S-SSB) used for initial access of the V2X communication system may include the sidelink primary synchronization signal(s) (S-PSS(s)), the sidelink secondary synchronization signal(s) (S-SSS(s)), and the physical sidelink broadcast channel (PSBCH). For example, the S-PSS(s) may be signal(s) used by a UE for detection of initial signal(s) and acquisition of synchronization. For example, the S-SSS(s) may be signal(s) used by the UE to obtain detailed synchronization and to detect a synchronization signal ID together with the S-PSS(s). For example, the PSBCH may be signal(s) used by a UE to signal basic system information. Accordingly, each signal included in the S-SSB may be a very important signal used by the UE to obtain synchronization and basic system information. Therefore, for normal data communication, the UE should initially receive and decode the S-SSB.

Meanwhile, in addition to the S-PSS(s), the S-SSS(s), and the PSBCH, the beginning of a slot used for SL transmission may be used as an AGC period required for a receiving UE to perform an AGC operation. In addition, the last part of the slot may be used as a switching gap (hereinafter, TX/RX switching gap) for the UE to change between a transmission operation and a reception operation.

Based on an embodiment of the present disclosure, an S-SSB structure satisfying the above condition is proposed. If one S-SSB signal spans one slot, a possible S-SSB structure for each SCS and for each cyclic prefix (CP) length may be shown as shown in FIG. 13.

Figure 13:
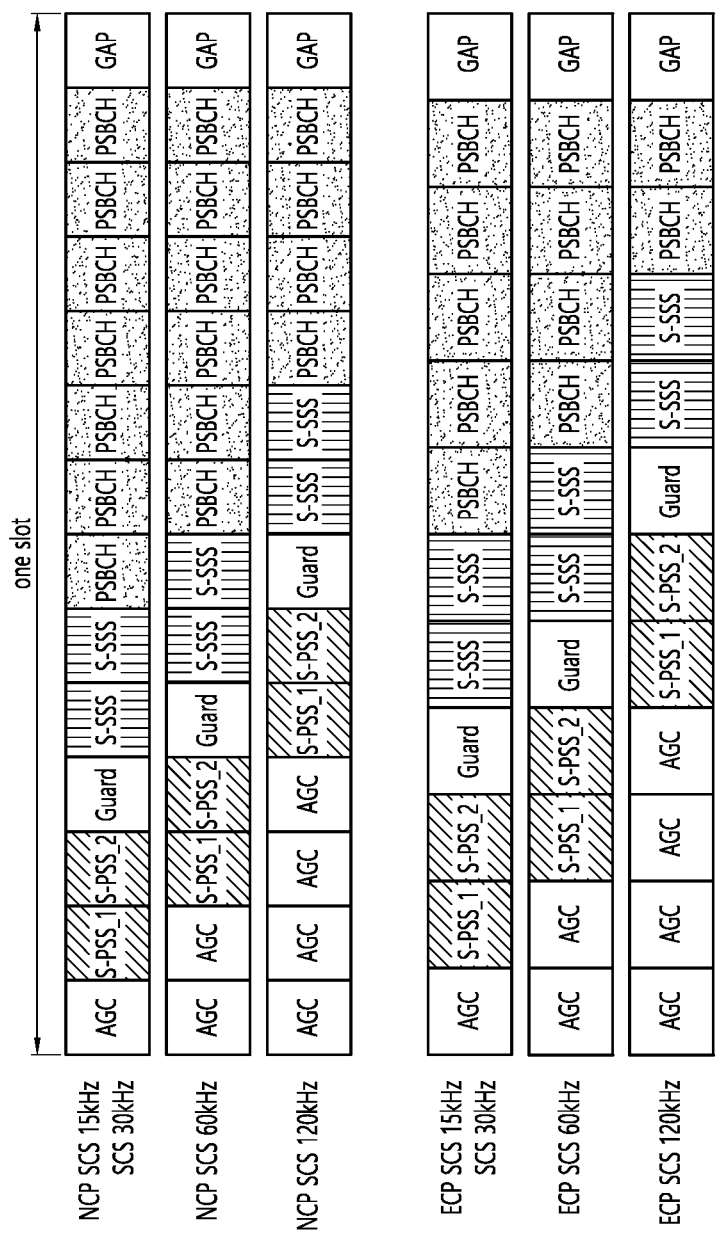
FIG. 13 shows an S-SSB structure based on an embodiment of the present disclosure.

FIG. 13 shows an S-SSB structure based on an embodiment of the present disclosure. The embodiment of FIG. 13 may be combined with various embodiments of the present disclosure.

In the embodiment of FIG. 13, it is assumed that the length of the AGC period is about 34 us. For example, it is assumed that the length of the AGC period is constant regardless of the cyclic prefix (CP) length.

Referring to FIG. 13, if the SCS is 15 kHz or 30 kHz, one AGC symbol may be required. If the SCS is 60 kHz, two AGC symbols may be needed in proportion to the SCS. If the SCS is 120 kHz, four AGC symbols may be needed in proportion to the SCS. Herein, each of S-PSS(s) and S-SSS(s) may consist of two symbols. Accordingly, a UE may be capable of one-shot detection for S-PSS(s) and S-SSS(s). In addition, a guard symbol may be located between S-PSS symbols and S-SSS symbols. For example, the guard symbol may be a time period required for a power amplifier of a UE to change transmission power due to a difference between transmission power of the S-PSS symbols and transmission power of the S-SSS symbols. FIG. 13 is an example of an S-SSB structure, and an AGC period may consist of a certain number (e.g., one) of AGC symbols regardless of the SCS and the CP length.

The TX/RX switching gap period may also be applied in the same manner as described above. That is, a different number of switching gap symbols may be used based on the SCS and the CP length, or a certain number (e.g., one) of switching gap symbols may be used regardless of the SCS and the CP length. The embodiment of FIG. 13 shows a case in which one GAP symbol is used in all cases.

For example, in the case of using NCP, one slot may consist of a total of 14 symbols. For example, in the case of using ECP, one slot may consist of a total of 12 symbols. According to the above description, in the embodiment of FIG. 13, in the case of using NCP and SCS=15 kHz or 30 kHz, the number of PSBCH symbols may be 7. For example, in the case of using NCP and SCS=60 kHz or 120 kHz, the number of PSBCH symbols may be 6 or 4, respectively. For example, in the case of using ECP and SCS=15 kHz or 30 kHz, the number of PSBCH symbols may be 5. For example, in the case of using ECP and SCS=60 kHz or 120 kHz, the number of PSBCH symbols may be 4 or 2, respectively.

As described above, the length of the AGC period or the switching gap period may vary based on the SCS and the CP length. As a result, the number of PSBCH symbols that a UE can transmit in one slot may vary. For example, if the amount of signaling data to be transmitted through the PSBCH by the UE is sufficiently small, the UE may transmit all the S-SSB through one slot for all combinations according to the SCS and the CP length. On the other hand, if the amount of signaling data to be transmitted through the PSBCH by the UE is relatively large, it may be impossible for the UE to transmit the S-SSB through one slot, or it may be insufficient due to deterioration in performance. In order to solve the above-described problem, a method for transmitting by a UE the S-SSB through a plurality of slots may be considered.

Figure 14:
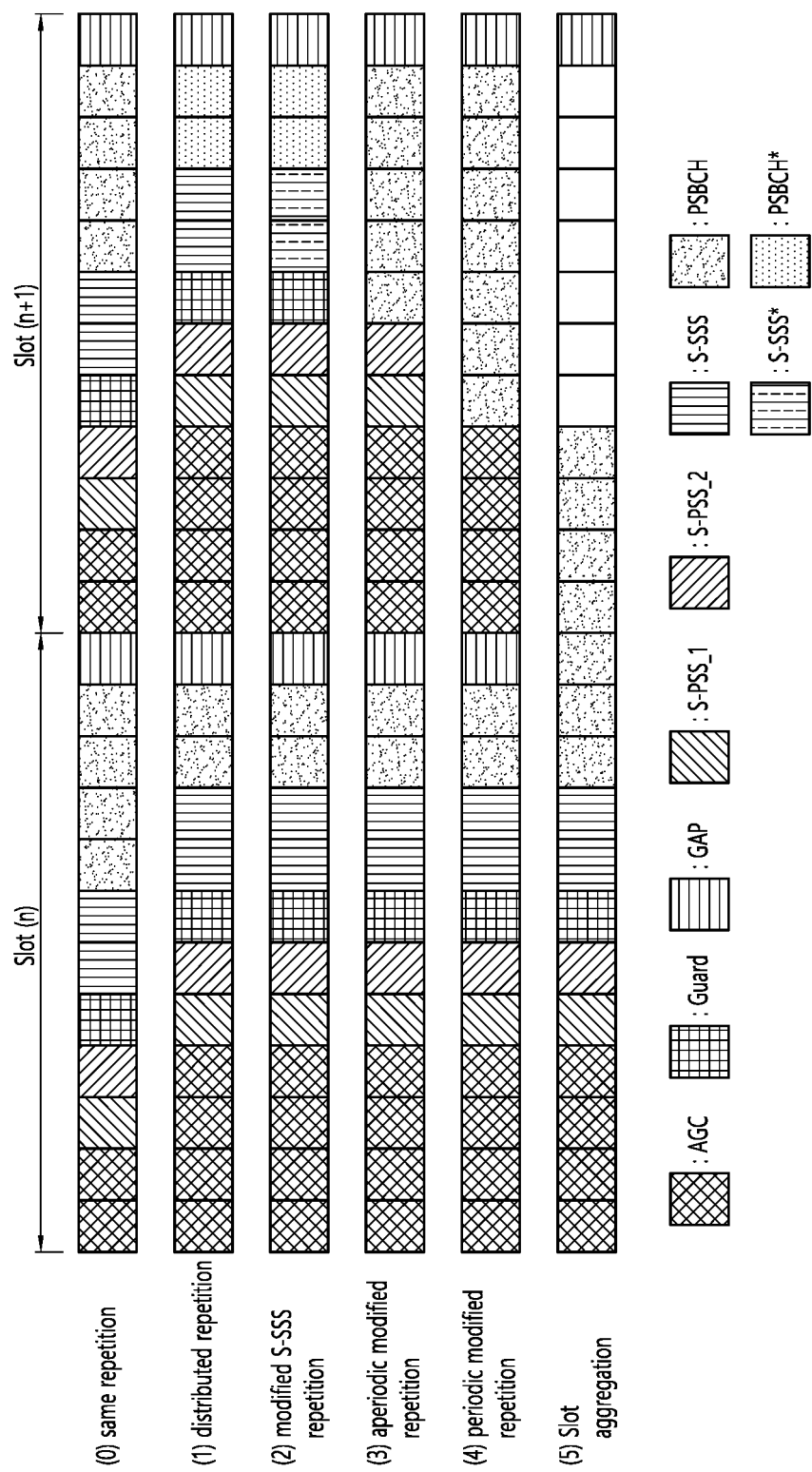
FIG. 14 shows a method for a UE to transmit S-SSB(s) through a plurality of slots, based on an embodiment of the present disclosure.

FIG. 14 shows a method for a UE to transmit S-SSB(s) through a plurality of slots, based on an embodiment of the present disclosure. The embodiment of FIG. 14 may be combined with various embodiments of the present disclosure.

Referring to FIG. 14, when the UE transmits S-SSB(s) through a plurality of slots, S-SSB(s) may be implemented by various methods. The embodiment of FIG. 14 is only an example, and at least one of the number of symbols, the number of AGC symbols, and/or the number of GAP symbols included in one slot may be configured differently based on at least one of the SCS, the CP length, and/or a carrier frequency. Alternatively, for example, at least one of the number of symbols, the number of AGC symbols, and/or the number of GAP symbols included in one slot may be configured to be the same.

According to the method (0), the UE may repeatedly transmit S-SSB(s) spanned in one slot through a plurality of slots. For example, if the UE can transmit all PSBCH signaling data in one S-SSB transmitted through one slot, the UE may repeatedly transmit S-SSB(s) spanned in one slot through a plurality of slots. In the embodiment of FIG. 14, if the UE can transmit all PSBCH signaling data using four PSBCH symbols, the UE may repeatedly transmit S-SSB(s) spanned in one slot through a plurality of slots. However, if the UE transmits only one S-SSB, the detection performance for the S-SSB and/or the decoding performance for the PSBCH may be deteriorated in a low SNR environment depending on the target application. To solve this, the UE may repeatedly transmit S-SSB(s) through a plurality of slots. In this case, signaling data transmitted through the PSBCH may be the same among a plurality of slots. However, among PSBCH contents, an index or direct frame number (DFN) of a slot in which the S-SSB is transmitted (e.g., increased every 1 ms period) may be configured differently according to the index of the repeatedly transmitted slot and may be transmitted. Accordingly, a receiving UE can determine the location in the time domain of the corresponding slot even by detecting any one of S-SSBs repeatedly transmitted by a transmitting UE, and through this, the receiving UE may determine the entire frame structure (e.g., 10 ms length).

Alternatively, in order to obtain a combining gain for the PSBCH, the UE may repeatedly transmit PSBCH and signaling data having perfectly the same value, the UE may transmit an index of the corresponding slot in which each S-SSB is transmitted through another method. In this case, a method for the UE to transmit the slot index or the direct frame number (DFN) may include a method for the UE to transmit information related to the slot index through a sequence which is scrambled to RS(s) (e.g., DM-RS(s), etc.) transmitted on the PSBCH.

Alternatively, the UE may transmit most significant bit (MSB) M bits of a value representing a slot index through the PSBCH, the UE may transmit least significant bit (LSB) L bits through RS(s) (e.g., DM-RS(s), etc.) transmitted on the PSBCH. In this case, M bits slot index information transmitted through the PSBCH may have the same value for all repeatedly transmitted slots. Accordingly, decoding performance of a receiving UE may be improved by combining and decoding the PSBCH value received by the receiving UE.

As described above, the method in which the UE transmits the all or the part of slot index value through RS(s) (e.g., DM-RS(s), etc.) transmitted on the PSBCH may be applied to the methods (0) to (5) of the embodiment of FIG. 14.

According to the method (1), the UE may repeatedly transmit S-SSB(s) spanned in one slot through a plurality of slots. In this respect, the method (1) is the same as the method (0). However, unlike the method (0), according to method (1), PSBCH signaling data transmitted through slot (n) and PSBCH signaling data transmitted through slot (n+1) may be different. According to the method (1), after the UE divides the entire PSBCH signaling data based on the number of slots to be repeatedly transmitted, the UE may encode each separated signaling data and transmit it through each slot. Alternatively, after the UE encodes the entire PSBCH signaling data, the UE may separate the encoded entire PSBCH signaling data based on the number of slots to be repeatedly transmitted, and the UE may transmit each separated encoded PSBCH signaling data in different slots. According to the above-described method, since the entire PSBCH signaling data can be transmitted once for every N slots corresponding to the repeated transmission period, the UE can transmit one slot index for N slots included in one repeated transmission period. In this case, for example, the UE may select the index of the first slot from among the N slots within one period as the slot index, and the UE may transmit the selected slot index. For example, the UE may select the index of the last slot from among the N slots within one period as the slot index, and the UE may transmit the selected slot index. For example, the UE may select a pre-configured index of a specific slot from among N slots within one period as the slot index, and the UE may transmit the selected slot index. For example, the slot index may be transmitted through the PSBCH. For example, the slot index may be transmitted through RS(s) (e.g., DM-RS(s), etc.) transmitted on the PSBCH.

According to the method (2), as in the case of the method (0), a transmitting UE may repeatedly transmit PSBCH signaling data through a plurality of slots, and a receiving UE may obtain a performance gain by combining a plurality of S-SSB signals transmitted through a plurality of slots and decoding it. Alternatively, according to the method (2), as in the case of the method (1), a transmitting UE may divide and transmit PSBCH signaling data through a plurality of slots. In this case, the transmitting UE may transmit by configuring a different S-SSS sequence for each S-SSB, and the receiving UE may determine an index of a slot in which each S-SSB is transmitted based on the S-SSS sequence. That is, when the transmitting UE transmits the slot index through a plurality of slots, the transmitting UE may use different S-SSS as many as the required number of slots, and the receiving UE may detect the slot index of the slot in which the S-SSB is transmitted by detecting each S-SSS.

For example, like the method in which the UE transmits the slot index through RS(s) (e.g., DM-RS(s), etc.) in the method (0), the UE transmits the MSB part of the slot index through the PSBCH through a plurality of slots, and the UE may transmit the LSB part of the slot index through the S-SSS sequence.

According to the method (3), if the UE divides S-SSB signal(s) into a plurality of slots and transmits it, the UE transmits both S-PSS(s) and S-SSS(s) in the first slot, while the UE may transmit only S-SSS(s) without transmitting S-PSS(s) in the second slot. In this case, since the UE can transmit more PSBCH instead of transmitting S-PSS(s) in the second slot, decoding performance for the PSBCH can be improved. In addition, the UE may transmit by configuring a different S-SSS sequence transmitted for each slot, and through this, the UE may transmit the index of the slot. Alternatively, the UE may transmit the slot index through RS(s) (e.g., DM-RS(s), etc.) transmitted on the PSBCH transmitted in each slot.

The advantage of the above-described method is that the UE can transmit the S-SSB aperiodically. In this case, a receiving UE that has received the first S-SSB may detect an S-SSB by detecting S-SSS(s) even if there is no information on the location of the next S-SSB transmitted. In this case, S-PSS(s) may be transmitted only in the first slot. Alternatively, in preparation for a case in which the receiving UE fails to detect the S-SSB transmitted in the first slot, S-PSS(s) may be transmitted once for every number of slots in which a specific number of S-SSBs are transmitted.

The method (4), unlike method (3), may be a method that can be used when S-SSB signal(s) is periodically transmitted. For example, according to the method (4), the UE may not transmit S-SSS(s) in a slot other than a slot in which S-PSS(s) is transmitted. Instead, the UE may transmit more PSBCH in a slot other than a slot in which S-PSS(s) is transmitted. In this case, the UE may allocate a larger number of symbols for PSBCH transmission, and as a result, decoding performance for PSBCH signaling data may be improved. In this case, the slot index transmitted through the PSBCH may be transmitted once for each period in which S-PSS(s) is transmitted. Alternatively, the slot index transmitted through the PSBCH may be transmitted for every slot. For example, if the slot index is transmitted through the PSBCH for every slot, the UE may transmit by setting the slot index transmitted through the PSBCH transmitted within one period to be the same as the slot index through which S-PSS(s) is transmitted. Alternatively, for example, if the slot index is transmitted through the PSBCH for every slot, the UE may transmit by setting the slot index transmitted through the PSBCH transmitted within one period to the index of any specific slot within one period. Alternatively, the entire PSBCH signaling data may be transmitted only once within one period, and in this case, the slot index may also be transmitted only once. Alternatively, as described in the method (0), the entire or the LSB part of the slot index may be transmitted through RS(s) (e.g., DM-RS(s), etc.) transmitted on the PSBCH, instead of through the PSBCH.

According to the method (5), unlike methods (0) to (4), the AGC period and the GAP period may not be configured for every slot. Herein, in order to secure the maximum number of symbols to transmit the PSBCH and improve decoding performance for the PSBCH by lowering an actual encoding rate, the UE may configure one virtual slot by aggregating two or more consecutive slots. In this case, since the AGC symbol is not required in a slot other than the first slot in which the UE transmits S-PSS(s), unnecessary overhead can be minimized. In addition, since the GAP period is not required in a slot other than the last slot, unnecessary overhead can be minimized. As described above, if the overhead is minimized, the UE may transmit the PSBCH by using the remaining symbol period. Accordingly, compared to methods (0) to (4), if the same encoding rate is assumed for the same number of slots, the UE can transmit the largest amount of PSBCH signaling data. Alternatively, the UE may secure the highest PSBCH decoding performance by using the lowest encoding rate.

Based on an embodiment of the present disclosure, in methods (0) to (5), the UE may transmit S-SSB(s) in arbitrary slot(s) and may transmit other channel and/or other signal in the remaining symbol period. For example, the other channel and/or the other signal may include at least one of a PSCCH, a PSSCH, and/or a PSFCH.

Based on an embodiment of the present disclosure, an S-SSB transmission period may be pre-defined in the system (e.g., UE), or may be pre-configured to the UE by a base station (e.g., gNB), or may be configured to the UE by the base station. In addition, based on an embodiment of the present disclosure, one or more S-SSBs may be transmitted within the S-SSB transmission period, and the number of one or more S-SSBs transmitted within the S-SSB transmission period may be pre-defined in the system (e.g., UE), or may be pre-configured to the UE by a base station (e.g., gNB), or may be configured to the UE by the base station.

Based on an embodiment of the present disclosure, regardless of the SCS, the S-SSB transmission period may be configured/defined as a specific value or an integer multiple of the specific value. For example, the specific value may be 160 ms. For example, the S-SSB transmission period may be at least 160 ms. The UE or the base station may transmit a different number of S-SSBs within one S-SSB transmission period based on the SCS. For example, the UE or the base station may transmit a larger number of S-SSBs as the SCS increases within one S-SSB transmission period. That is, the number of S-SSBs transmitted within one S-SSB transmission period may be proportional to the SCS. In this case, the UE or the base station can secure the same link budget regardless of the SCS, and thus the same coverage performance can be secured.

Figure 15:
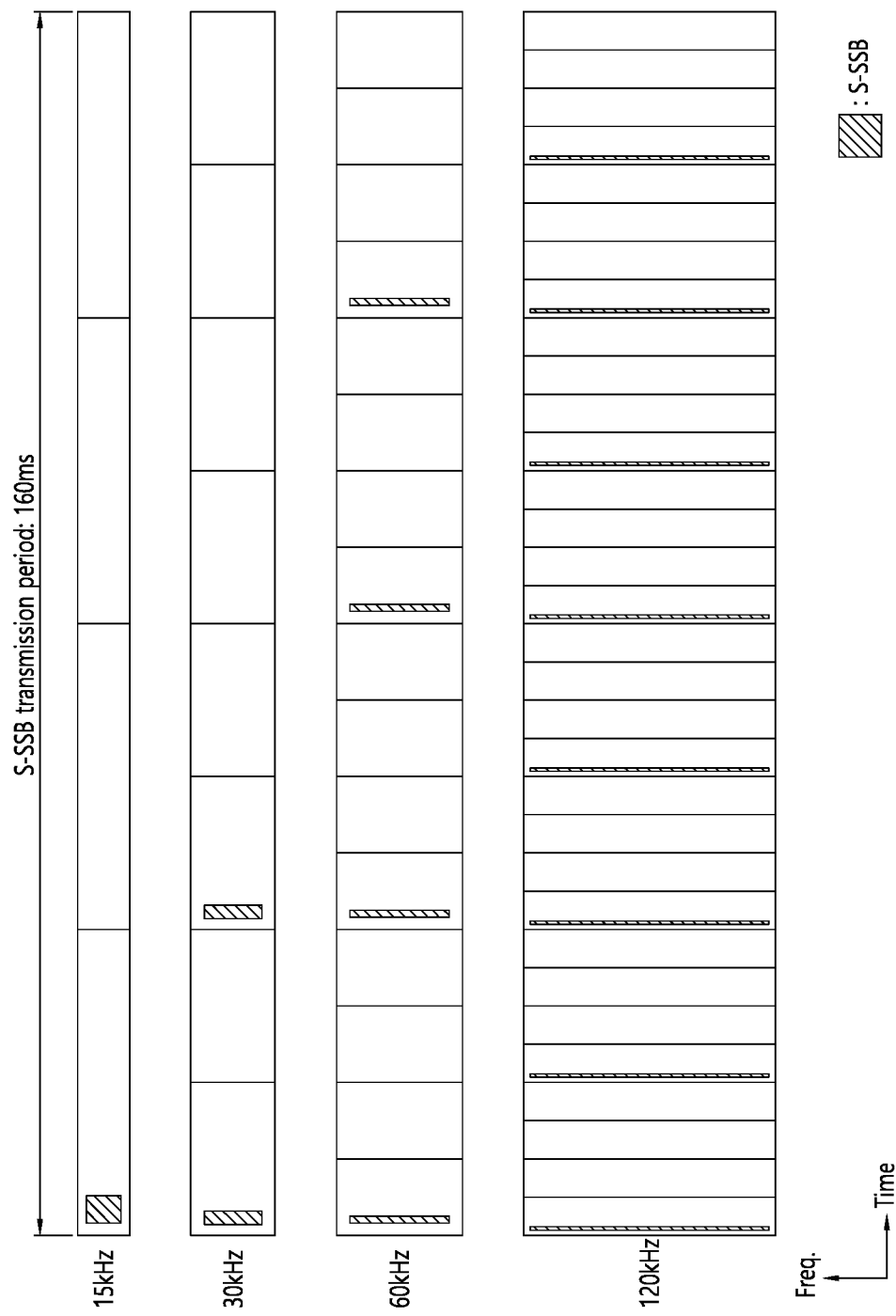
FIG. 15 shows a method for a UE or a base station to transmit a different number of S-SSBs according to the SCS within one S-SSB transmission period, in the case of defining/configuring the S-SSB transmission period as 160 ms regardless of the SCS, based on an embodiment of the present disclosure.

FIG. 15 shows a method for a UE or a base station to transmit a different number of S-SSBs according to the SCS within one S-SSB transmission period, in the case of defining/configuring the S-SSB transmission period as 160 ms regardless of the SCS, based on an embodiment of the present disclosure. The embodiment of FIG. 15 may be combined with various embodiments of the present disclosure.

Referring to FIG. 15, a UE or a base station may transmit S-SSB(s) through non-contiguous slots.

Figure 16:
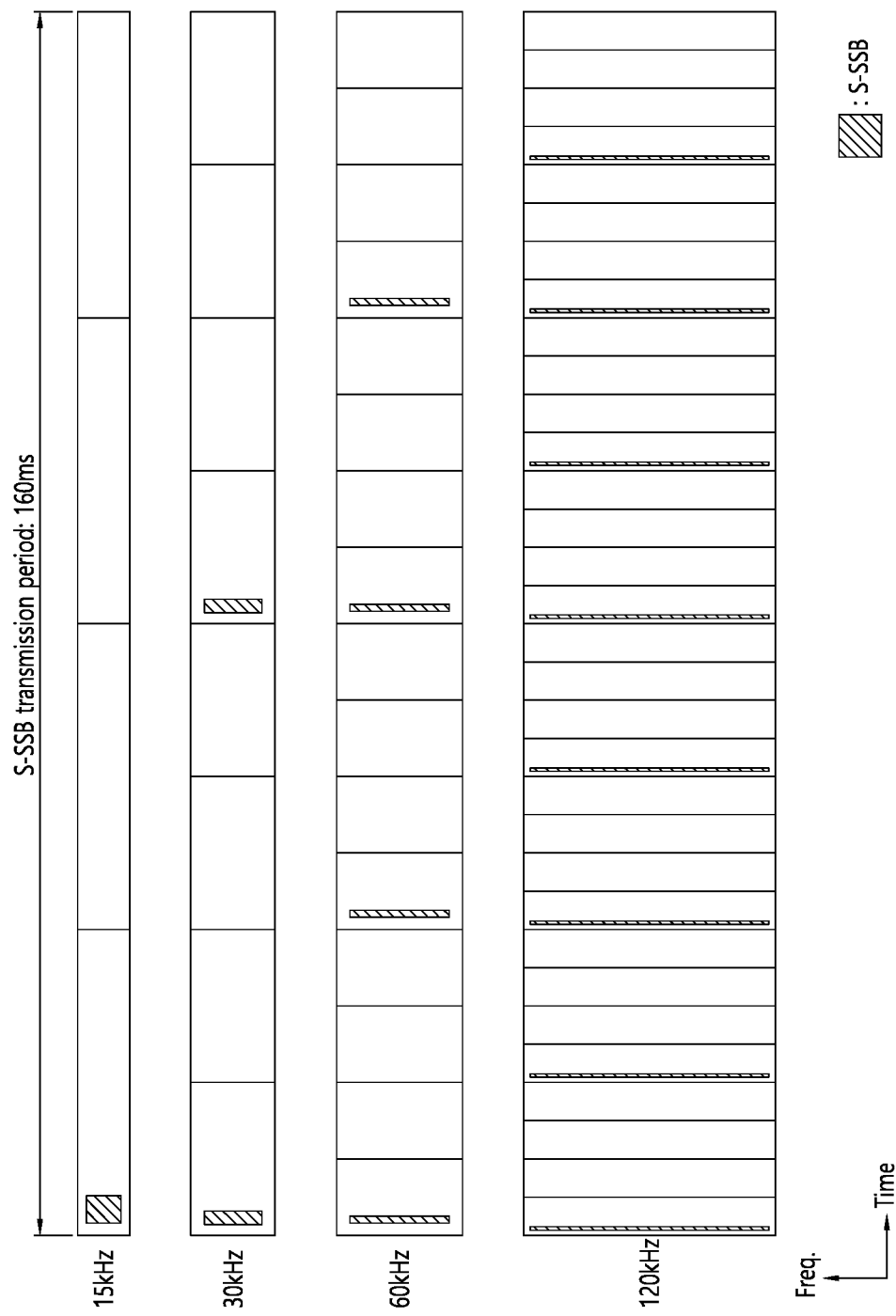
FIG. 16 shows a method for a UE or a base station to transmit a different number of S-SSBs according to the SCS within one S-SSB transmission period, in the case of defining/configuring the S-SSB transmission period as 160 ms regardless of the SCS, based on an embodiment of the present disclosure.

FIG. 16 shows a method for a UE or a base station to transmit a different number of S-SSBs according to the SCS within one S-SSB transmission period, in the case of defining/configuring the S-SSB transmission period as 160 ms regardless of the SCS, based on an embodiment of the present disclosure. The embodiment of FIG. 16 may be combined with various embodiments of the present disclosure.

Referring to FIG. 16, a UE or a base station may transmit S-SSB(s) through non-contiguous slots.

Figure 17:
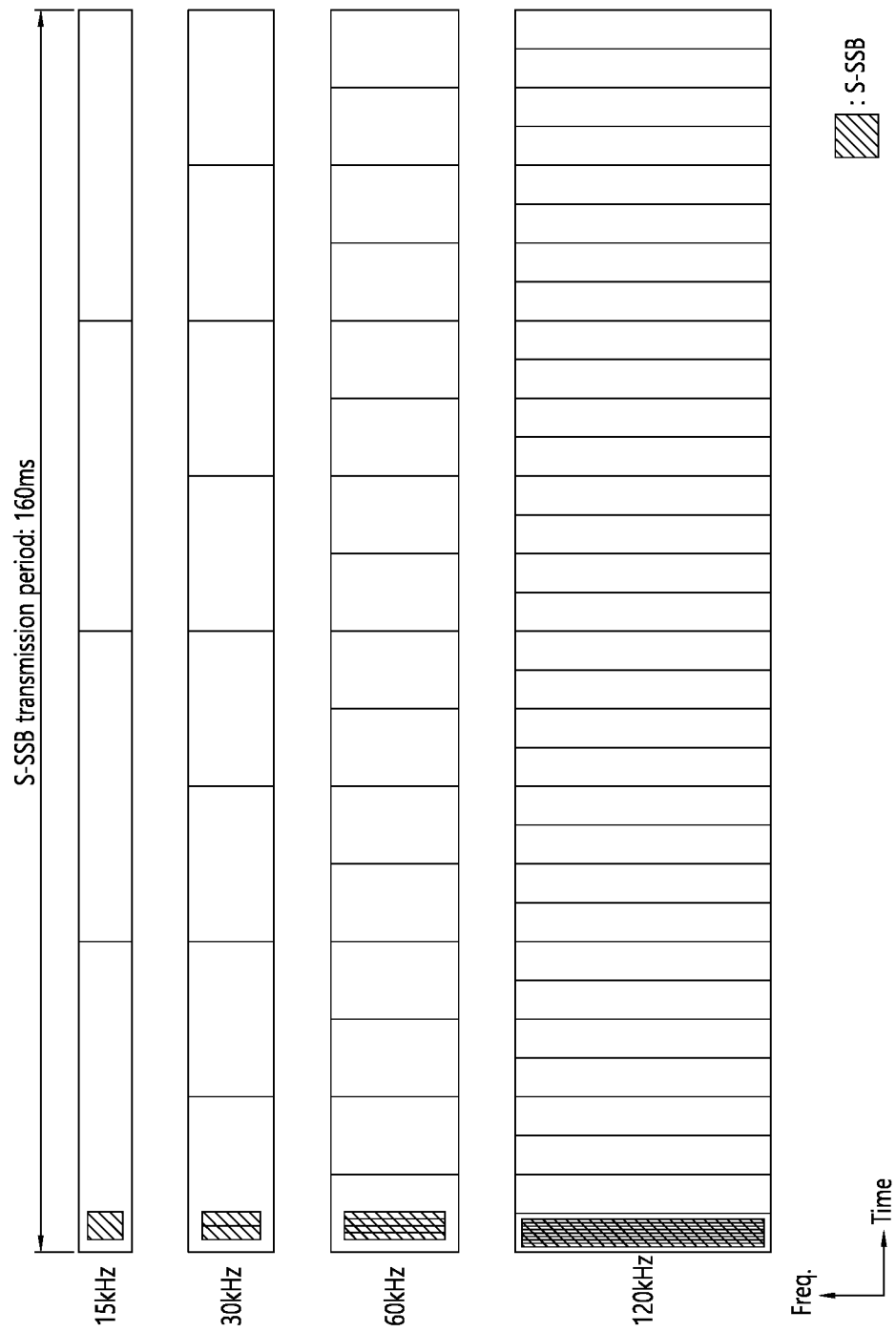
FIG. 17 shows a method for a UE or a base station to transmit a different number of S-SSBs according to the SCS within one S-SSB transmission period, in the case of defining/configuring the S-SSB transmission period as 160 ms regardless of the SCS, based on an embodiment of the present disclosure.

FIG. 17 shows a method for a UE or a base station to transmit a different number of S-SSBs according to the SCS within one S-SSB transmission period, in the case of defining/configuring the S-SSB transmission period as 160 ms regardless of the SCS, based on an embodiment of the present disclosure. The embodiment of FIG. 17 may be combined with various embodiments of the present disclosure.

Referring to FIG. 17, a UE or a base station may transmit S-SSB(s) through consecutive slots. In this case, for example, S-SSB(s) may be transmitted on N consecutive slots within the S-SSB transmission period 160 ms. For example, N is a positive integer, and the number of consecutive slots (i.e., N) may be configured/defined differently according to the SCS.

Referring to FIGS. 15 to 17, regardless of the SCS, the S-SSB transmission period may be defined/configured as 160 ms. In addition, the UE may transmit a different number of S-SSBs according to the SCS within one S-SSB transmission period. The UE may transmit one S-SSB for 15 kHz SCS, two S-SSBs for 30 kHz SCS, four S-SSBs for 60 kHz SCS, and eight S-SSBs for 120 kHz SCS within one S-SSB transmission period. As shown in FIG. 17, if the UE or the base station transmits S-SSB(s) through consecutive slots, for example, S-SSB(s) may be transmitted on N consecutive slots within the S-SSB transmission period 160 ms. For example, N is a positive integer, and N may be configured/defined as different values according to the SCS. The technical idea of the present disclosure is not limited to the above embodiment, and the S-SSB transmission period may be defined/configured as a specific value or a multiple of the specific value regardless of the SCS. In this case, the UE may transmit 1*X S-SSBs for 15 kHz SCS, 2*X S-SSBs for 30 kHz SCS, 4*X S-SSBs for 60 kHz SCS, and 8*X S-SSBs for 120 kHz SCS within one S-SSB transmission period. Herein, X may be a positive integer.

Alternatively, based on an embodiment of the present disclosure, the S-SSB transmission period may be differently configured/defined according to the SCS. For example, as the SCS increases, the S-SSB transmission period may decrease. That is, the S-SSB transmission period may be inversely proportional to the SCS. In this case, the number of S-SSBs transmitted within one S-SSB transmission period may be equally configured/defined regardless of the SCS. The UE may transmit the same number of S-SSBs within one S-SSB transmission period regardless of the SCS. In this case, the UE may secure the same link budget regardless of the SCS, and thus the same coverage performance may be secured.

Figure 18:
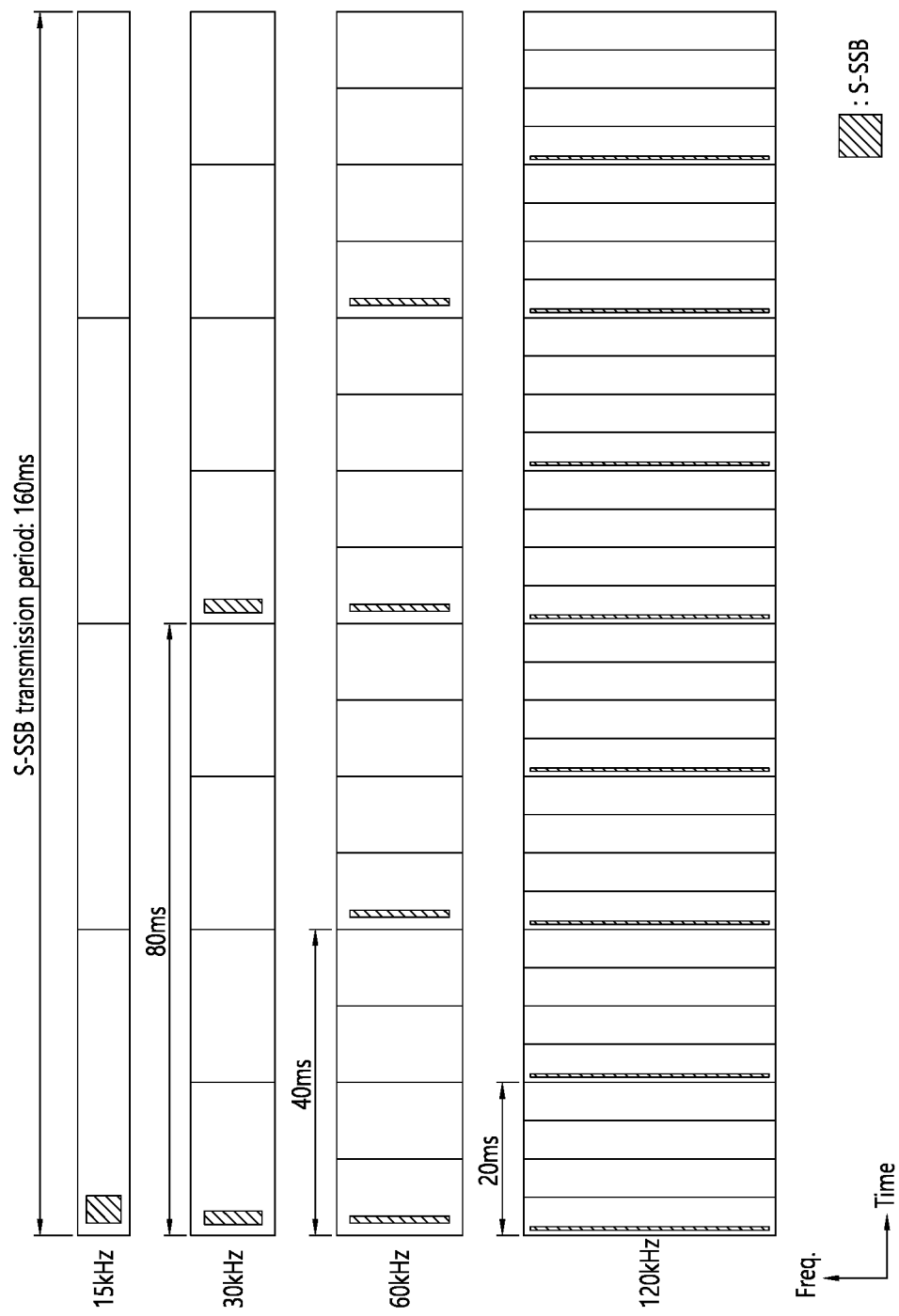
FIG. 18 shows a method for a UE to transmit the same number of S-SSBs regardless of the SCS within one S-SSB transmission period, in the case of defining/configuring the S-SSB transmission period differently according to the SCS, based on an embodiment of the present disclosure.

FIG. 18 shows a method for a UE to transmit the same number of S-SSBs regardless of the SCS within one S-SSB transmission period, in the case of defining/configuring the S-SSB transmission period differently according to the SCS, based on an embodiment of the present disclosure. The embodiment of FIG. 18 may be combined with various embodiments of the present disclosure.

Figure 19:
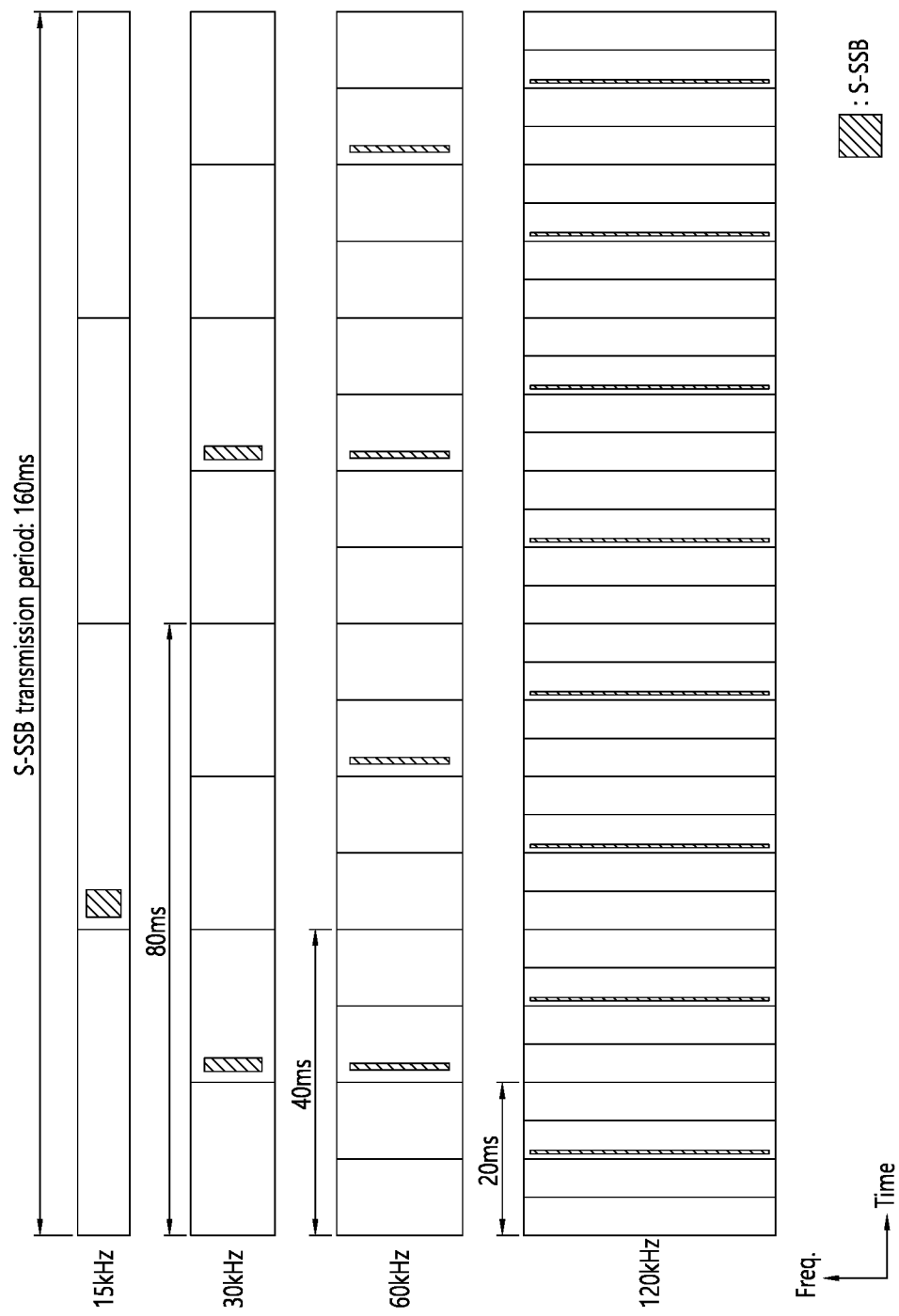
FIG. 19 shows a method for a UE to transmit the same number of S-SSBs regardless of the SCS within one S-SSB transmission period, in the case of defining/configuring the S-SSB transmission period differently according to the SCS, based on an embodiment of the present disclosure.

FIG. 19 shows a method for a UE to transmit the same number of S-SSBs regardless of the SCS within one S-SSB transmission period, in the case of defining/configuring the S-SSB transmission period differently according to the SCS, based on an embodiment of the present disclosure. The embodiment of FIG. 19 may be combined with various embodiments of the present disclosure.

Referring to FIGS. 18 and 19, according to the SCS, the S-SSB transmission period may be defined/configured as 160 ms for 15 kHz SCS, 80 ms for 30 kHz SCS, 40 ms for 60 kHz SCS, and 20 ms for 120 kHz SCS. In addition, the UE may transmit the same number of S-SSBs according to the SCS within one S-SSB transmission period. The technical idea of the present disclosure is not limited to the above embodiment, and according to the SCS, the S-SSB transmission period may be defined/configured as 160*X ms for 15 kHz SCS, 80*X ms for 30 kHz SCS, 40*X ms for 60 kHz SCS, and 20*X ms for 120 kHz SCS. Alternatively, according to the SCS, the S-SSB transmission period may be defined/configured as T*X ms for 15 kHz SCS, (T/2)*X ms for 30 kHz SCS, (T/4)*X ms for 60 kHz SCS, and (T/8)*X ms for 120 kHz SCS. Herein, X may be a positive integer.

Based on an embodiment of the present disclosure, in case that a first UE or a base station transmits S-SSB(s) to a second UE, time resource(s) for the second UE to relay the received S-SSB(s) to a third UE may be configured/defined. The second UE may obtain synchronization with the first UE or the base station by receiving the S-SSB(s) from the first UE or the base station, and the third UE may obtain synchronization with the first UE or the base station and the second UE by receiving the S-SSB(s) relayed from the second UE. The S-SSB transmission of the first UE or the base station and the S-SSB relay of the second UE may be transmitted through consecutive slots or may be transmitted through non-consecutive slots.

For example, the second UE may receive the S-SSBs through consecutive slots, and the second UE may relay/transmit the S-SSBs to the third UE through consecutive slots. For example, if the second UE receives S-SSBs from the base station or the first UE through the N-th slot, the (N+1)-th slot, and the (N+2)-th slot, the second UE may transmit/relay the received S-SSBs to the third UE through the M-th slot, the (M+1)-th slot, and the (M+2)-th slot. Herein, N+2 may be a positive integer less than M, and N and M may be indices of slots. This has the advantage of minimizing the latency required for receiving and relaying the S-SSBs.

For example, the second UE may receive the S-SSBs through consecutive slots, and the second UE may relay/transmit the S-SSBs to the third UE through non-consecutive slots. For example, if the second UE receives the S-SSBs from the base station or the first UE through the N-th slot, the (N+1)-th slot, and the (N+2)-th slot, the second UE may transmit/relay the received S-SSBs to the third UE through the M-th slot, the (M+2)-th slot, and the (M+4)-th slot. Herein, N+2 may be a positive integer less than M, and N and M may be indices of slots. By doing this, even if the second UE receives the S-SSBs through consecutive slots, it has the advantage of being able to relay the S-SSBs through non-consecutive slots allocated for SL communication.

For example, the second UE may receive the S-SSBs through non-consecutive slots, and the second UE may relay/transmit the S-SSBs to the third UE through consecutive slots. For example, if the second UE receives the S-SSBs from the base station or the first UE through the N-th slot, the (N+2)-th slot, and the (N+4)-th slot, the second UE may transmit/relay the received S-SSBs to the third UE through the M-th slot, the (M+1)-th slot, and the (M+2)-th slot. Herein, N+4 may be a positive integer less than M, and N and M may be indices of slots. By doing this, even if the S-SSBs are received through non-consecutive slots, there is an advantage in that the latency required for relaying the S-SSBs is minimized.

For example, the second UE may receive the S-SSBs through non-consecutive slots, and the second UE may relay/transmit the S-SSBs to the third UE through non-consecutive slots. For example, if the second UE receives the S-SSBs from the base station or the first UE through the N-th slot, the (N+2)-th slot, and the (N+4)-th slot, the second UE may transmit/relay the received S-SSBs to the third UE through the M-th slot, the (M+2)-th slot, and the (M+4)-th slot. Herein, N+4 may be a positive integer less than M, and N and M may be indices of slots. By doing this, there is an advantage that the second UE can receive and relay the S-SSBs through non-consecutive slots allocated for SL communication.

For example, in case that the second UE receives and relays a plurality of repeatedly transmitted S-SSBs through non-consecutive slots, the second UE may not wait until all of the repeated S-SSBs are received. For example, the second UE which has received one S-SSB may relay/transmit the S-SSB to the third UE in the next transmittable slot, and upon receiving the next S-SSB, the second UE may relay/transmit the next S-SSB to the third UE in the next transmittable slot. That is, the UE may perform an operation in which S-SSB reception and relay are interleaved with each other. Hereinafter, a case in which the second UE relays/transmits three SSBs received from the first UE or the base station to the third UE will be described in detail. The second UE may receive an S-SSB from the first UE or the base station through the N-th slot. In addition, the second UE may transmit/relay the S-SSB, which is received from the first UE or the base station through the N-th slot, to the third UE through the next transmittable (N+1)-th slot. Thereafter, the second UE may receive an S-SSB through the (N+3)-th slot from the first UE or the base station. In addition, the second UE may transmit/relay the S-SSB, which is received from the first UE or the base station through the (N+3)-th slot, to the third UE through the next transmittable (N+4)-th slot. Thereafter, the second UE may receive an S-SSB from the first UE or the base station through the (N+5)-th slot. In addition, the second UE may transmit/relay the S-SSB, which is received from the first UE or the base station through the (N+5)-th slot, to the third UE through the next transmittable (N+6)-th slot. Herein, N may be an integer greater than or equal to zero, and N may be an index of a slot. By doing this, the second UE may perform S-SSB relay for each S-SSB reception without relaying after waiting for all repeatedly transmitted S-SSB signals, and the latency required for the third UE to synchronize with the second UE according to channel conditions can be minimized. For example, the S-SSB may be transmitted in units of slots, and interleaving of reception and relay of the S-SSB may be performed in units of slots.

Based on an embodiment of the present disclosure, the UE may periodically transmit S-SSB(s). In this case, the UE may transmit a plurality of S-SSBs within one transmission period. In this case, for example, the plurality of S-SSBs may be S-SSBs independent of each other. That is, the UE may repeatedly transmit the mutually independent S-SSB within one transmission period. Alternatively, for example, the plurality of S-SSBs may be the same S-SSB. That is, the UE may repeatedly transmit the same S-SSB within one transmission period. In this case, the location in the time domain in which the plurality of S-SSBs are transmitted within one transmission period may be determined by at least one of the following parameters.

1) Time offset from the start of the S-SSB transmission period to transmission of the first S-SSB
2) Time interval transmitted between S-SSBs For example, the time offset may be configured or pre-configured for the UE through higher layer signaling. For example, the time offset may be signaled to the UE through a DCI or a MAC CE. Herein, the time offset may be a constant value within one S-SSB transmission period. For example, the time interval transmitted between the S-SSBs may be configured of pre-configured for the UE through higher layer signaling. For example, the time interval transmitted between the S-SSBs may be signaled to the UE through a DCI or a MAC CE. Herein, the time interval transmitted between the S-SSBs may be a constant value within one S-SSB transmission period.

For example, the time offset may be configured or pre-configured for the UE through higher layer signaling. For example, the time offset may be signaled to the UE through a DCI or a MAC CE. Herein, the time offset may be a constant value within one S-SSB transmission period. For example, the time interval transmitted between the S-SSBs may be configured of pre-configured for the UE through higher layer signaling. For example, the time interval transmitted between the S-SSBs may be signaled to the UE through a DCI or a MAC CE. Herein, the time interval transmitted between the S-SSBs may be signaled as an arbitrary interval value within one S-SSB transmission period.

For example, the time offset may be configured or pre-configured for the UE through higher layer signaling. For example, the time offset may be signaled to the UE through a DCI or a MAC CE. Herein, the time offset may be signaled as an arbitrary interval value within one S-SSB transmission period. For example, the time interval transmitted between the S-SSBs may be configured of pre-configured for the UE through higher layer signaling. For example, the time interval transmitted between the S-SSBs may be signaled to the UE through a DCI or a MAC CE. Herein, the time interval transmitted between the S-SSBs may be a constant value within one S-SSB transmission period.

For example, the location of each S-SSB may be configured or pre-configured for the UE through higher layer signaling within one S-SSB transmission period. For example, the location of each S-SSB may be signaled to the UE through a DCI or a MAC CE within one S-SSB transmission period. Herein, the location of each S-SSB may be determined as an arbitrary time domain location.

Figure 20:
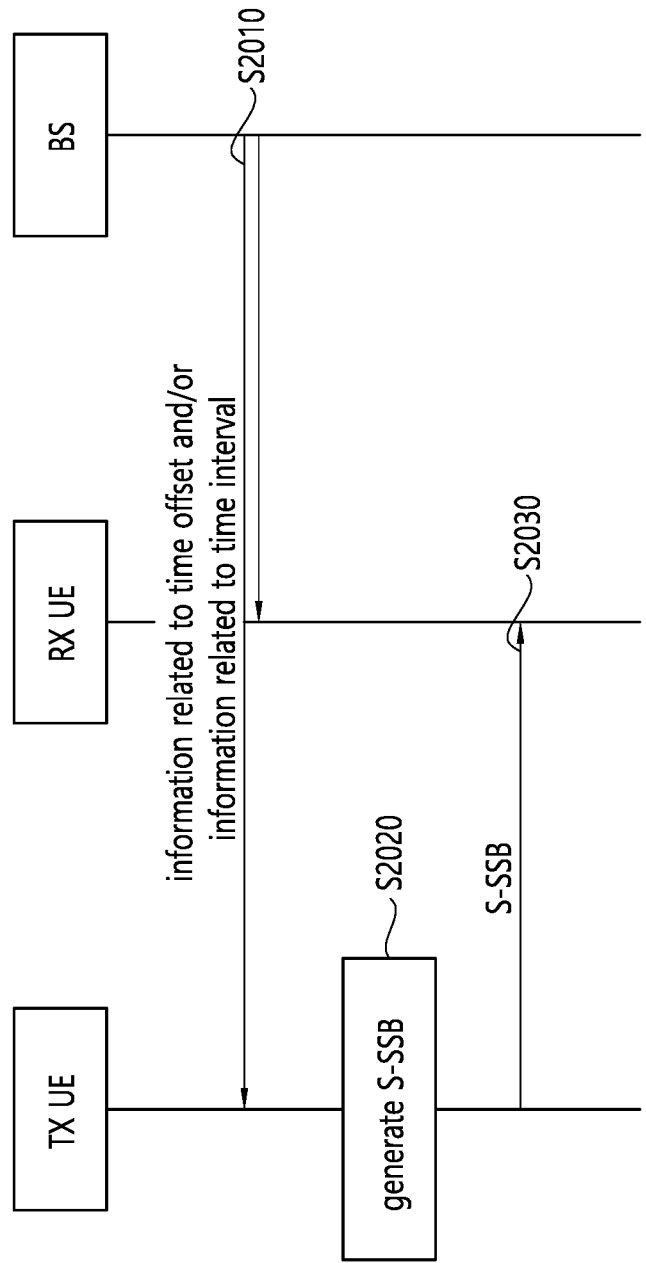
FIG. 20 shows a procedure for a UE to transmit/receive S-SSB(s), based on an embodiment of the present disclosure.

FIG. 20 shows a procedure for a UE to transmit/receive S-SSB(s), based on an embodiment of the present disclosure. The embodiment of FIG. 20 may be combined with various embodiments of the present disclosure.

Referring to FIG. 20, in step S2010, a base station may transmit information related to a time offset and/or information related to a time interval. For example, the base station may transmit information related to a time offset and/or information related to a time interval to a transmitting UE or a receiving UE. For example, information related to a time offset and/or information related to a time interval may be transmitted through higher layer signaling. For example, the base station may transmit an RRC message including information related to a time offset and/or information related to a time interval to the transmitting UE and/or the receiving UE.

For example, the information related to the time offset may be information related to the time offset from the start of the S-SSB period to the first S-SSB. For example, the information related to the time offset may be information related to the slot offset from the start of the S-SSB period to the first S-SSB. For example, the information related to the time offset may be information related to the number of slots from the start of the S-SSB period to the first S-SSB. For example, the first S-SSB may be the first S-SSB transmitted within the S-SSB period.

For example, the information related to the time interval may be information related to the time interval between S-SSBs. For example, the information related to the time interval may be information related to the slot interval between S-SSBs. For example, the information related to the time interval may be information related to the slot interval between neighboring S-SSBs. For example, the information related to the time interval may be applied only when a plurality of S-SSBs are within the S-SSB period.

Additionally, the base station may transmit information related to the number of S-SSB transmissions within one S-SSB period. For example, the base station may transmit information related to the number of S-SSB transmissions within one S-SSB period to the transmitting UE or the receiving UE. For example, the number of S-SSB transmissions within one S-SSB period may be configured differently according to the SCS and a frequency range (FR). For example, according to the SCS and the FR, the number of S-SSB transmissions within one S-SSB period may be configured as shown in Table 7.

TABLE 7

| FR(Frequency Range) | SCS | the number of S-SSB transmissions |
|---|---|---|
| FR1 | 15 kHz | 1 |
| | 30 kHz | 1, 2 |
| | 60 kHz | 1, 2, 4 |
| FR2 | 60 kHz | 1, 2, 4, 8, 16, 32 |
| | 120 kHz | 1, 2, 4, 8, 16, 32, 64 |

In step S2020, the transmitting UE may generate S-SSB(s). For example, the S-SSB(s) may include S-PSS(s), S-SSS(s), and PSBCH(s).

In step S2030, the transmitting UE may transmit one or more S-SSBs within the S-SSB period based on the information related to the time offset and/or the information related to the time interval. For example, if the SCS is 15 kHz, the transmitting UE may transmit one S-SSB within the S-SSB period based on the information related to the time offset. For example, if the SCS is 30 kHz, the transmitting UE may transmit one S-SSB within the S-SSB period based on the information related to the time offset. For example, if the SCS is 30 kHz, the transmitting UE may transmit two S-SSBs within the S-SSB period based on the information related to the time offset and the information related to the time interval. For example, if the SCS is 60 kHz, the transmitting UE may transmit one S-SSB within the S-SSB period based on the information related to the time offset. For example, if the SCS is 60 kHz, the transmitting UE may transmit two S-SSBs within the S-SSB period based on the information related to the time offset and the information related to the time interval. For example, if the SCS is 60 kHz, the transmitting UE may transmit four S-SSBs within the S-SSB period based on the information related to the time offset and the information related to the time interval.

Additionally, the receiving UE may decode one or more S-SSBs within the S-SSB period based on the information related to the time offset and/or the information related to the time interval. For example, the receiving UE may receive one or more S-SSBs within the S-SSB period based on the information related to the time offset and/or the information related to the time interval.

As described above, if the base station transmits the information related to the time offset and/or the information related to the time interval, the UE can know the time domain in which the S-SSB(s) is transmitted within the S-SSB period. Accordingly, the transmitting UE may transmit one or more S-SSBs to the receiving UE through one or more slots corresponding to the time domain, and the receiving UE can efficiently decode or receive one or more S-SSBs in one or more slots corresponding to the time domain.

In the present disclosure, the S-SSB structure that can be configured differently according to the SCS, the CP length, and the carrier frequency has been proposed. Based on the proposed structure, when the UE transmits S-SSB(s), for the purpose of transmitting a large amount of PSBCH signaling data, or for the purpose of improving decoding performance for PSBCH signaling data, the UE may repeatedly transmit the S-SSB, or the UE may transmit the S-SSB through a plurality of slots by dividing the S-SSB. Alternatively, the UE may minimize unnecessary overhead by aggregating a plurality of slots, and may maximize the transmission efficiency of the PSBCH or the amount of signaling data.

Figure 21:
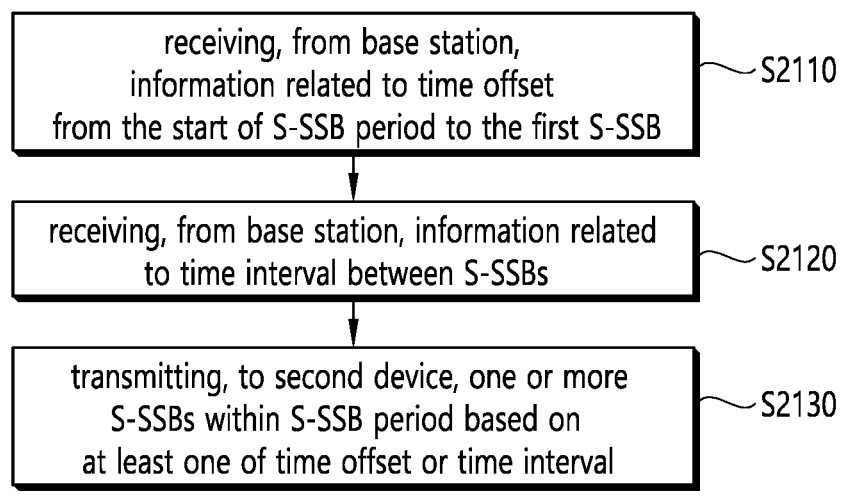
FIG. 21 shows a method for a first device to perform wireless communication, based on an embodiment of the present disclosure.

FIG. 21 shows a method for a first device to perform wireless communication, based on an embodiment of the present disclosure. The embodiment of FIG. 21 may be combined with various embodiments of the present disclosure.

Referring to FIG. 21, in step S2110, the first device may receive, from a base station, information related to a time offset from a start of a sidelink synchronization signal block (S-SSB) period to a first S-SSB. In step S2120, the first device may receive, from the base station, information related to a time interval between S-SSBs. In step S2130, the first device may transmit, to a second device, one or more S-SSBs within the S-SSB period based on at least one of the time offset or the time interval.

For example, the first S-SSB may be an S-SSB transmitted first among the one or more S-SSBs transmitted within the S-SSB period. For example, the time offset from the start of the S-SSB period to the first S-SSB may be a number of slots between the start of the S-SSB period and the first S-SSB. For example, the time interval between the S-SSBs may be a slot interval between neighboring S-SSBs.

For example, the S-SSB period may be configured for the first device to 160 ms regardless of subcarrier spacing.

For example, the first S-SSB may be transmitted to the second device after the time offset from the start of the S-SSB period. For example, the first S-SSB may be transmitted based on subcarrier spacing of 15 kHz.

For example, a second S-SSB may be transmitted to the second device after the time interval from a transmission time of the first S-SSB. For example, the first S-SSB and the second S-SSB may be transmitted based on subcarrier spacing of 30 kHz.

For example, a third S-SSB may be transmitted to the second device after the time interval from a transmission time of the second S-SSB, and a fourth S-SSB may be transmitted to the second device after the time interval from the transmission time of the third S-SSB. For example, the first S-SSB, the second S-SSB, the third S-SSB, and the fourth S-SSB may be transmitted based on subcarrier spacing of 60 kHz.

For example, the information related to the time offset and the information related to the time interval may be received through a radio resource control (RRC) message.

For example, based on a plurality of S-SSBs being transmitted within the S-SSB period, the information related to the time interval may be applicable.

For example, the first S-SSB may be transmitted by the second device to a third device between the transmission time of the first S-SSB and a transmission time of the second S-SSB, and the second S-SSB may be transmitted by the second device to the third device after the transmission time of the second S-SSB. For example, the first S-SSB and the second S-SSB may be transmitted to the third device by the second device after a transmission time of the second S-SSB.

For example, the one or more S-SSBs may be transmitted to the second device through non-contiguous slots, and the one or more S-SSBs may be transmitted by the second device to the third device through non-contiguous slots. For example, the one or more S-SSBs may be transmitted to the second device through non-contiguous slots, and the one or more S-SSBs may be transmitted by the second device to the third device through contiguous slots. For example, the one or more S-SSBs may be transmitted to the second device through contiguous slots, and the one or more S-SSBs may be transmitted by the second device to the third device through non-contiguous slots. For example, the one or more S-SSBs may be transmitted to the second device through contiguous slots, and the one or more S-SSBs may be transmitted by the second device to the third device through contiguous slots.

The proposed method can be applied to device(s) described below. First, the processor 102 of the first device 100 may control the transceiver 106 to receive, from a base station, information related to a time offset from a start of a sidelink synchronization signal block (S-SSB) period to a first S-SSB. In addition, the processor 102 of the first device 100 may control the transceiver 106 to receive, from the base station, information related to a time interval between S-SSBs. In addition, the processor 102 of the first device 100 may control the transceiver 106 to transmit, to a second device, one or more S-SSBs within the S-SSB period based on at least one of the time offset or the time interval.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: receive, from a base station, information related to a time offset from a start of a sidelink synchronization signal block (S-SSB) period to a first S-SSB; receive, from the base station, information related to a time interval between S-SSBs; and transmit, to a second device, one or more S-SSBs within the S-SSB period based on at least one of the time offset or the time interval.

Based on an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: receive, from a base station, information related to a time offset from a start of a sidelink synchronization signal block (S-SSB) period to a first S-SSB; receive, from the base station, information related to a time interval between S-SSBs; and transmit, to a second UE, one or more S-SSBs within the S-SSB period based on at least one of the time offset or the time interval.

Based on an embodiment of the present disclosure, a non-transitory computer-readable storage medium storing instructions may be provided. For example, the instructions, when executed, may cause a first device to: receive, from a base station, information related to a time offset from a start of a sidelink synchronization signal block (S-SSB) period to a first S-SSB; receive, from the base station, information related to a time interval between S-SSBs; and transmit, to a second device, one or more S-SSBs within the S-SSB period based on at least one of the time offset or the time interval.

Figure 22:
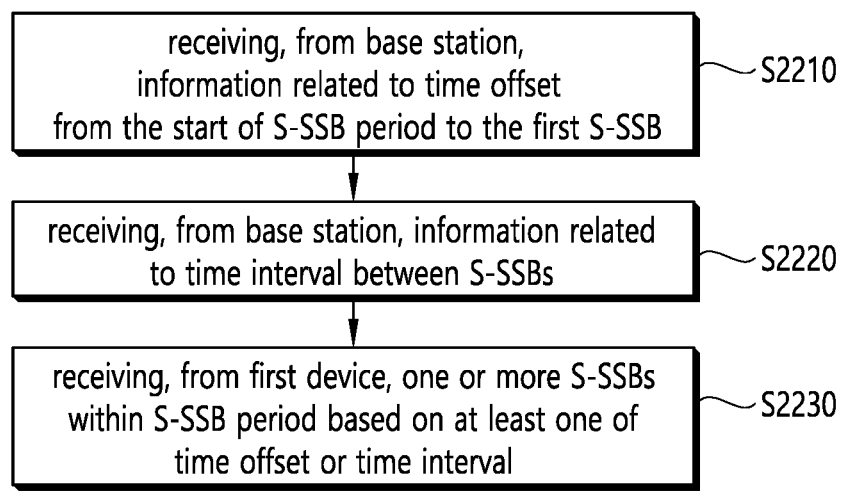
FIG. 22 shows a method for a second device to perform wireless communication, based on an embodiment of the present disclosure.

FIG. 22 shows a method for a second device to perform wireless communication, based on an embodiment of the present disclosure. The embodiment of FIG. 22 may be combined with various embodiments of the present disclosure.

Referring to FIG. 22, in step S2210, the second device may receive, from a base station, information related to a time offset from a start of a sidelink synchronization signal block (S-SSB) period to a first S-SSB. In step S2220, the second device may receive, from the base station, information related to a time interval between S-SSBs. In step S2230, the second device may receive, from a first device, one or more S-SSBs within the S-SSB period based on at least one of the time offset or the time interval. For example, the first S-SSB may be an S-SSB transmitted first among the one or more S-SSBs transmitted within the S-SSB period. For example, the time offset from the start of the S-SSB period to the first S-SSB may be a number of slots between the start of the S-SSB period and the first S-SSB. For example, the time interval between the S-SSBs may be a slot interval between neighboring S-SSBs.

The proposed method can be applied to device(s) described below. First, the processor 202 of the second device 200 may control the transceiver 206 to receive, from a base station, information related to a time offset from a start of a sidelink synchronization signal block (S-SSB) period to a first S-SSB. In addition, the processor 202 of the second device 200 may control the transceiver 206 to receive, from the base station, information related to a time interval between S-SSBs. In addition, the processor 202 of the second device 200 may control the transceiver 206 to receive, from a first device, one or more S-SSBs within the S-SSB period based on at least one of the time offset or the time interval.

Based on an embodiment of the present disclosure, a second device configured to perform wireless communication may be provided. For example, the second device may comprise: one or more memories storing instructions; one or more transceivers; and one or more processors connected to the one or more memories and the one or more transceivers. For example, the one or more processors may execute the instructions to: receive, from a base station, information related to a time offset from a start of a sidelink synchronization signal block (S-SSB) period to a first S-SSB; receive, from the base station, information related to a time interval between S-SSBs; and receive, from a first device, one or more S-SSBs within the S-SSB period based on at least one of the time offset or the time interval.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 23:
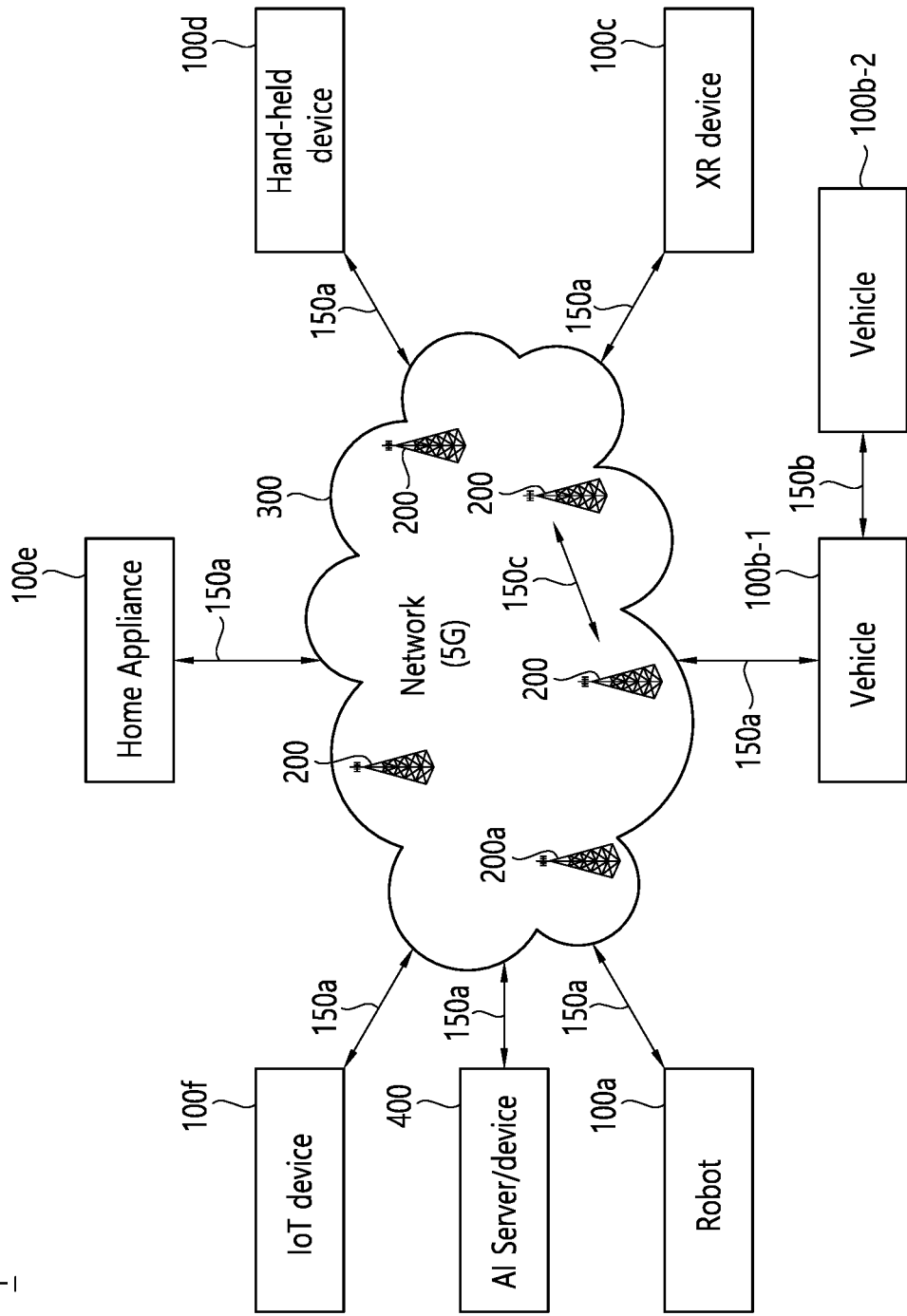
FIG. 23 shows a communication system 1, based on an embodiment of the present disclosure.

FIG. 23 shows a communication system 1, based on an embodiment of the present disclosure.

Referring to FIG. 23, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 24:
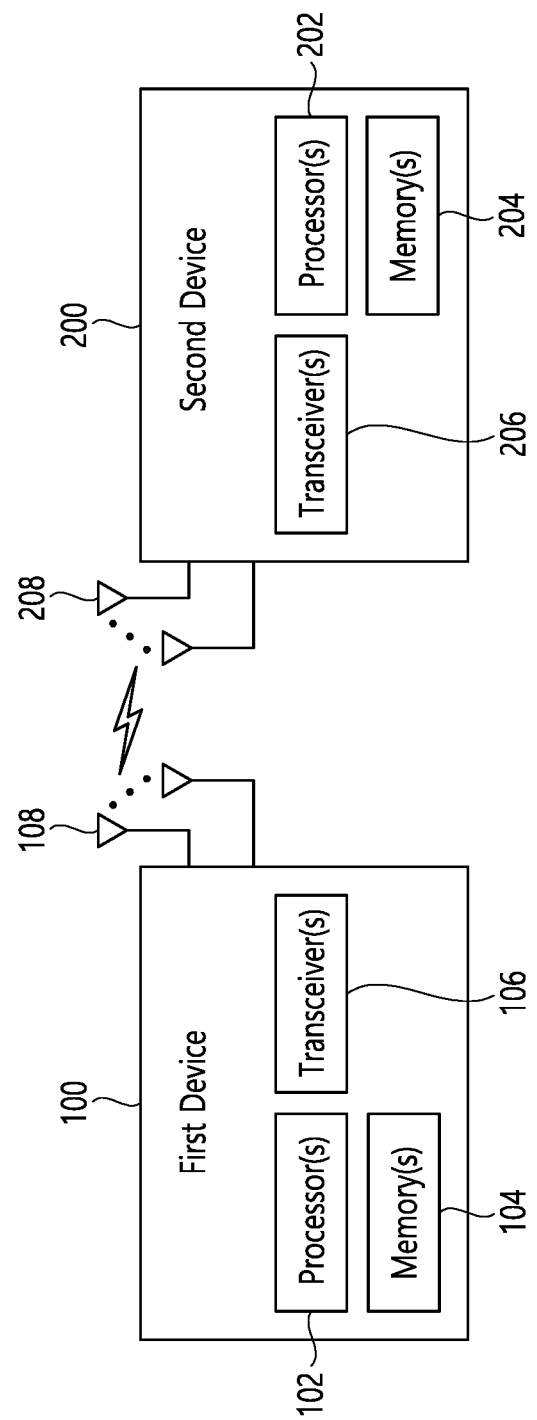
FIG. 24 shows wireless devices, based on an embodiment of the present disclosure.

FIG. 24 shows wireless devices, based on an embodiment of the present disclosure.

Referring to FIG. 24, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 23.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 202 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 25:
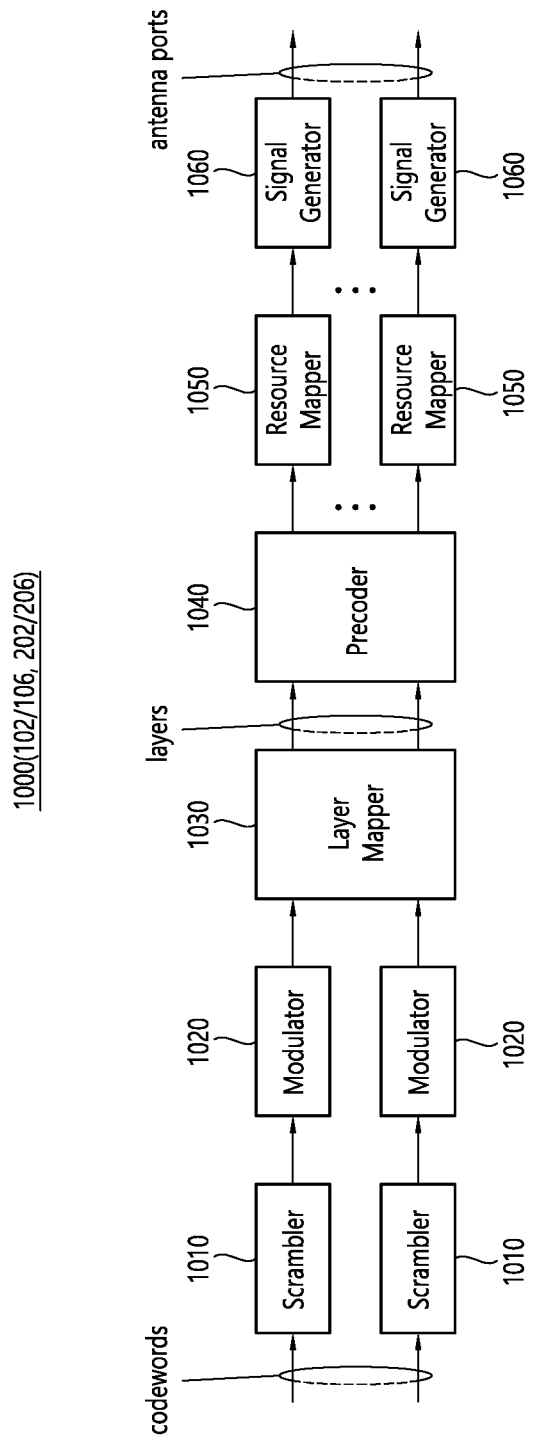
FIG. 25 shows a signal process circuit for a transmission signal, based on an embodiment of the present disclosure.

FIG. 25 shows a signal process circuit for a transmission signal, based on an embodiment of the present disclosure.

Referring to FIG. 25, a signal processing circuit 1000 may include scramblers 1010, modulators 1020, a layer mapper 1030, a precoder 1040, resource mappers 1050, and signal generators 1060. An operation/function of FIG. 25 may be performed, without being limited to, the processors 102 and 202 and/or the transceivers 106 and 206 of FIG. 24. Hardware elements of FIG. 25 may be implemented by the processors 102 and 202 and/or the transceivers 106 and 206 of FIG. 24. For example, blocks 1010 to 1060 may be implemented by the processors 102 and 202 of FIG. 24. Alternatively, the blocks 1010 to 1050 may be implemented by the processors 102 and 202 of FIG. 24 and the block 1060 may be implemented by the transceivers 106 and 206 of FIG. 24.

Codewords may be converted into radio signals via the signal processing circuit 1000 of FIG. 25. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 25. For example, the wireless devices (e.g., 100 and 200 of FIG. 24) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 26:
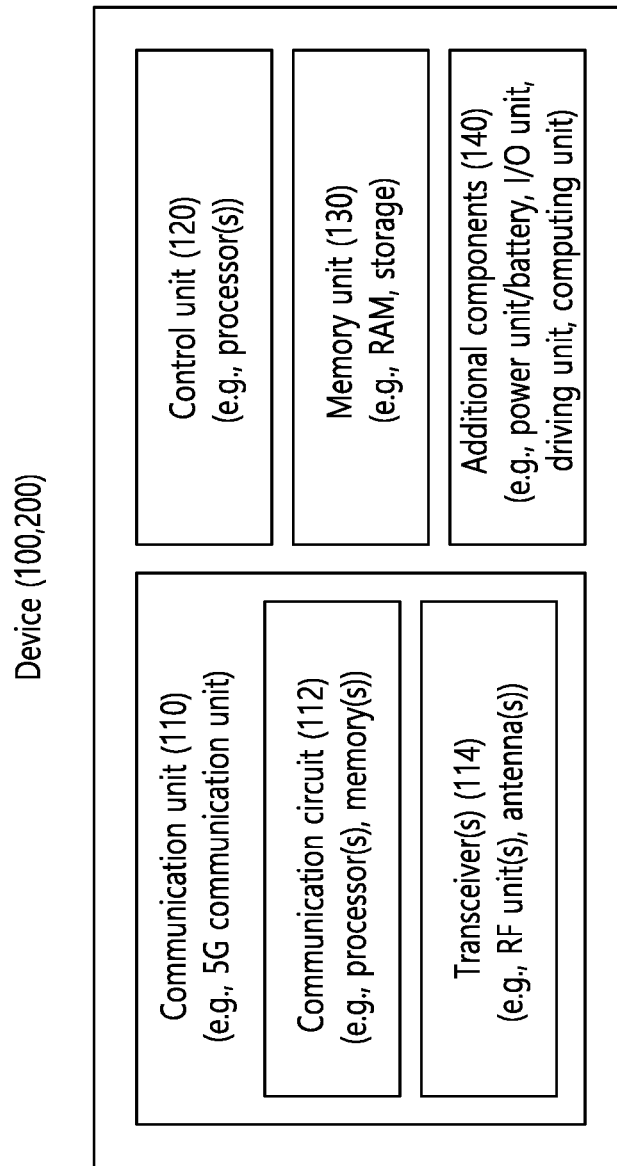
FIG. 26 shows another example of a wireless device, based on an embodiment of the present disclosure.

FIG. 26 shows another example of a wireless device, based on an embodiment of the present disclosure. The wireless device may be implemented in various forms according to a use-case/service (refer to FIG. 23).

Referring to FIG. 26, wireless devices 100 and 200 may correspond to the wireless devices 100 and 200 of FIG. 24 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 24. For example, the transceiver(s) 114 may include the one or more transceivers 106 and 206 and/or the one or more antennas 108 and 208 of FIG. 24. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 23), the vehicles (100b-1 and 100b-2 of FIG. 23), the XR device (100c of FIG. 23), the hand-held device (100d of FIG. 23), the home appliance (100e of FIG. 23), the IoT device (100f of FIG. 23), a digital broadcast terminal, a hologram device, a public safety device, an MTC device, a medicine device, a fintech device (or a finance device), a security device, a climate/environment device, the AI server/device (400 of FIG. 23), the BSs (200 of FIG. 23), a network node, etc. The wireless device may be used in a mobile or fixed place according to a use-example/service.

In FIG. 26, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 26 will be described in detail with reference to the drawings.

Figure 27:
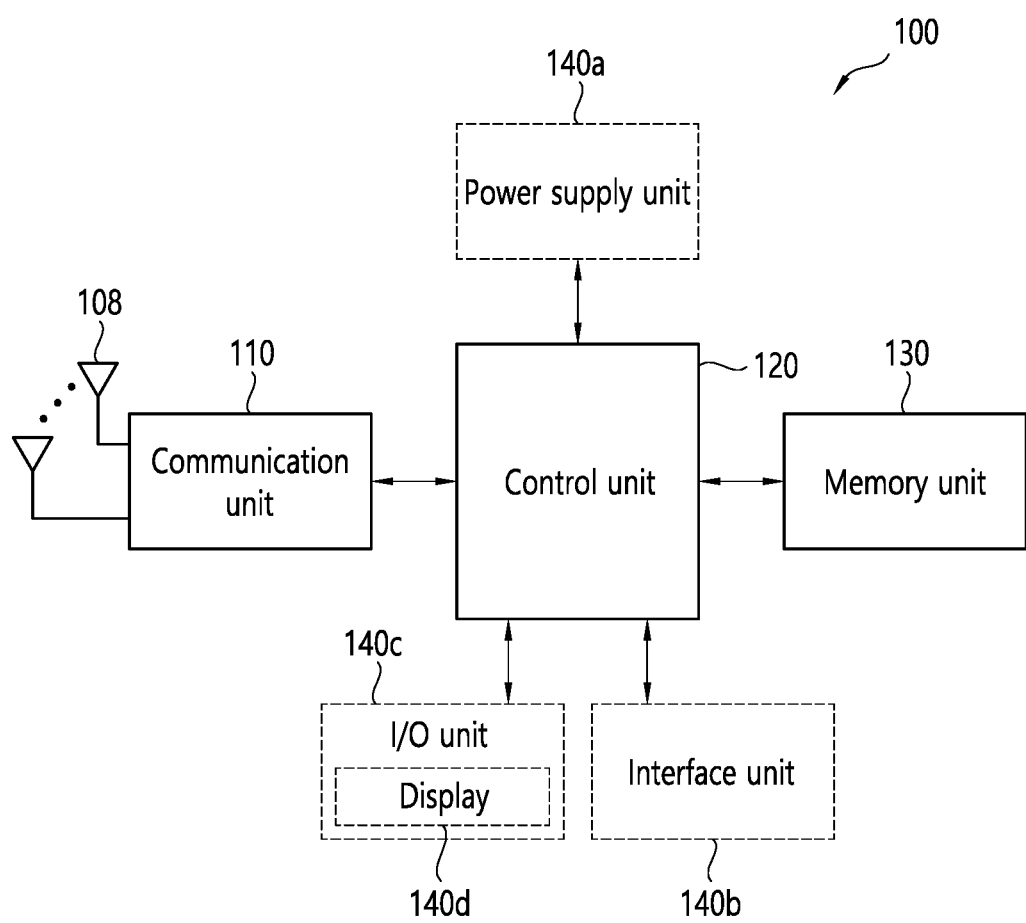
FIG. 27 shows a hand-held device, based on an embodiment of the present disclosure.

FIG. 27 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 27, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 26, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 28:
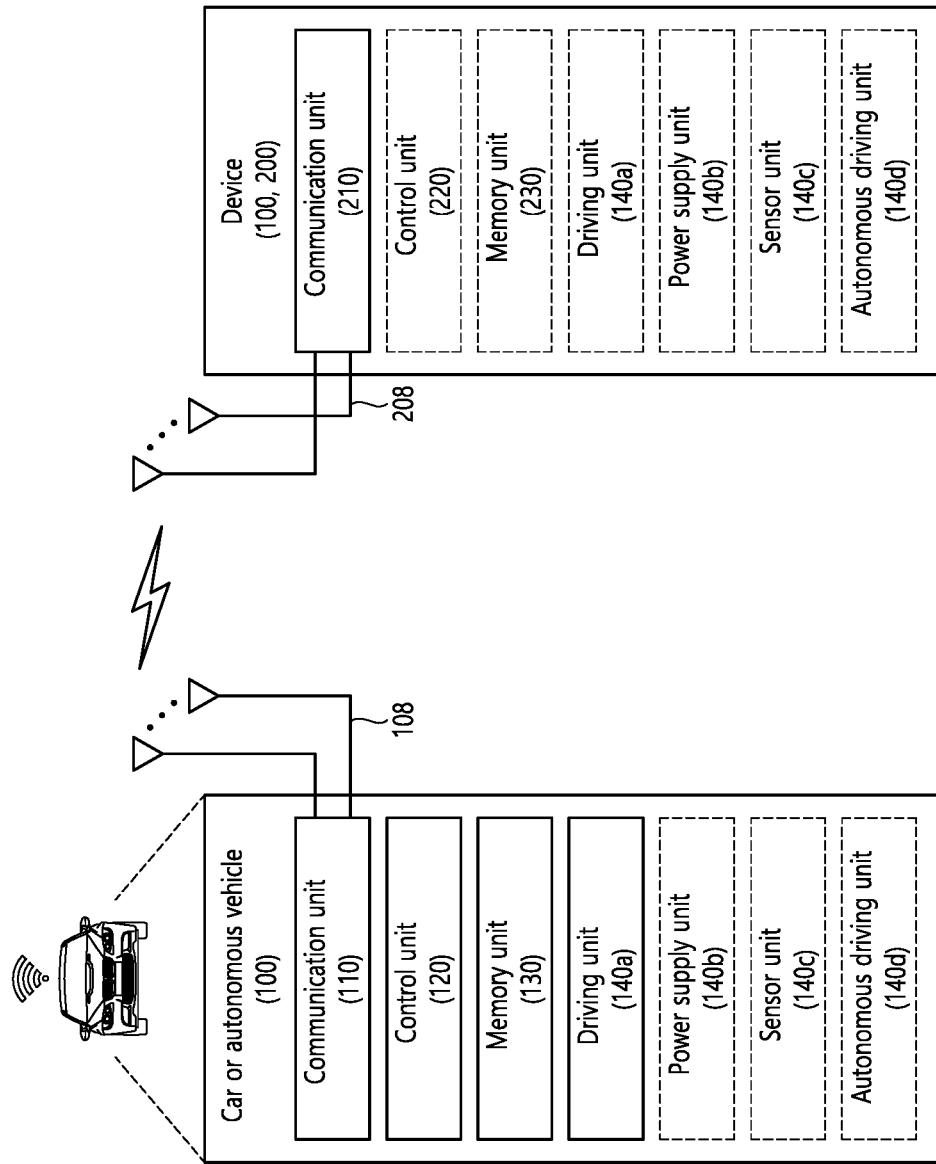
FIG. 28 shows a vehicle or an autonomous vehicle, based on an embodiment of the present disclosure.

FIG. 28 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 28, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 26, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
    obtaining information related to a time offset from a start of a sidelink synchronization signal block (S-SSB) period to a first S-SSB;
    obtaining information related to a time interval between S-SSBs; and
    transmitting, to a second device, one or more S-SSBs within the S-SSB period,
    wherein, based on the information related to the time offset, the first S-SSB among the one or more S-SSBs is included in a slot located after the time offset from the start of the S-SSB period, and
    wherein, based on the information related to the time offset and the information related to the time interval, a second S-SSB among the one or more S-SSBs is included in a slot located after the time interval from the slot including the first S-SSB.

2. The method of claim 1, wherein the information related to the time offset and the information related to the time interval are received from a base station.

3. The method of claim 1, wherein the time offset from the start of the S-SSB period to the first S-SSB is a number of slots between the start of the S-SSB period and the first S-SSB.

4. The method of claim 1, wherein the time interval between the S-SSBs is a slot interval between neighboring S-SSBs.

5. The method of claim 1, wherein the S-SSB period is configured for the first device to 160 ms regardless of subcarrier spacing.

6. The method of claim 1, wherein the information related to the time offset and the information related to the time interval are pre-configured for the first device.

7. The method of claim 1, wherein, based on the information related to the time offset and the information related to the time interval, a third S-SSB among the one or more S-SSBs is included in a slot located after the time interval from the slot including the second S-SSB.

8. The method of claim 1, wherein the first S-SSB is transmitted by the second device to a third device between the slot including the first S-SSB and the slot including the second S-SSB, and
    wherein the second S-SSB is transmitted by the second device to the third device after the slot including the second S-SSB.

9. The method of claim 1, wherein the first S-SSB and the second S-SSB are transmitted by the second device to a third device after the slot including the second S-SSB.

10. The method of claim 1, wherein a maximum number of S-SSBs allowed to be transmitted within the S-SSB period is different based on subcarrier spacing.

11. The method of claim 1, wherein the information related to the time offset and the information related to the time interval are received through a radio resource control (RRC) message.

12. The method of claim 1, wherein, based on a plurality of S-SSBs being transmitted within the S-SSB period, the information related to the time interval is applicable.

13. The method of claim 1, wherein the one or more S-SSBs are transmitted to the second device through non-contiguous slots or contiguous slots, and
    wherein the one or more S-SSBs are transmitted by the second device to a third device through non-contiguous slots or contiguous slots.

14. A first device configured to perform wireless communication, the first device comprising:
    one or more memories storing instructions;
    one or more transceivers; and
    one or more processors connected to the one or more memories and the one or more transceivers, wherein the one or more processors execute the instructions to:

obtain information related to a time offset from a start of a sidelink synchronization signal block (S-SSB) period to a first S-SSB;

obtain information related to a time interval between S-SSBs; and transmit, to a second device, one or more S-SSBs within the S-SSB period, wherein, based on the information related to the time offset, the first S-SSB among the one or more S-SSBs is included in a slot located after the time offset from the start of the S-SSB period, and wherein, based on the information related to the time offset and the information related to the time interval, a second S-SSB among the one or more S-SSBs is included in a slot located after the time interval from the slot including the first S-SSB.

15. The first device of claim 14, wherein the information related to the time offset and the information related to the time interval are received from a base station.

16. The first device of claim 14, wherein the time offset from the start of the S-SSB period to the first S-SSB is a number of slots between the start of the S-SSB period and the first S-SSB.

17. The first device of claim 14, wherein the time interval between the S-SSBs is a slot interval between neighboring S-SSBs.

18. The first device of claim 14, wherein the S-SSB period is configured for the first device to 160 ms regardless of subcarrier spacing.

19. The first device of claim 14, wherein the information related to the time offset and the information related to the time interval are pre-configured for the first device.

20. An apparatus configured to control a first user equipment (UE), the apparatus comprising:

one or more processors; and one or more memories operably connected to the one or more processors and storing instructions, wherein the one or more processors execute the instructions to:

obtain information related to a time offset from a start of a sidelink synchronization signal block (S-SSB) period to a first S-SSB;

obtain information related to a time interval between S-SSBs; and transmit, to a second UE, one or more S-SSBs within the S-SSB period, wherein, based on the information related to the time offset, the first S-SSB among the one or more S-SSBs is included in a slot located after the time offset from the start of the S-SSB period, and wherein, based on the information related to the time offset and the information related to the time interval, a second S-SSB among the one or more S-SSBs is included in a slot located after the time interval from the slot including the first S-SSB.

* * * * *